US012579241B2

(12) United States Patent
Okumura et al.

(10) Patent No.: US 12,579,241 B2
(45) Date of Patent: Mar. 17, 2026

(54) SERVER-BASED BIOMETRIC AUTHENTICATION SYSTEM FOR PARTNER BUSINESSES, SERVER DEVICE, AUTHENTICATION TERMINAL, CONTROL METHOD OF SERVER DEVICE, AND STORAGE MEDIUM

(71) Applicant: NEC Corporation, Tokyo (JP)

(72) Inventors: Taichi Okumura, Tokyo (JP); Noriyuki Hiramoto, Tokyo (JP); Honami Yuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 18/280,199

(22) PCT Filed: Mar. 5, 2021

(86) PCT No.: PCT/JP2021/008773
§ 371 (c)(1),
(2) Date: Sep. 1, 2023

(87) PCT Pub. No.: WO2022/185543
PCT Pub. Date: Sep. 9, 2022

(65) Prior Publication Data
US 2024/0152590 A1 May 9, 2024

(51) Int. Cl.
*G06F 21/00* (2013.01)
*G06F 21/32* (2013.01)
(Continued)

(52) U.S. Cl.
CPC ....... *G06F 21/32* (2013.01); *G06Q 20/40145* (2013.01); *G06V 40/172* (2022.01)

(58) Field of Classification Search
CPC .............. G06F 21/32; G06Q 20/40145; G06Q 10/1057; G06Q 10/10; G06Q 10/105; G06Q 50/12; G06V 40/172
See application file for complete search history.

(56) References Cited

U.S. PATENT DOCUMENTS

2013/0024334 A1* 1/2013 Kozlay .......... G06Q 10/063114
340/5.83
2018/0174127 A1 6/2018 Takasaki
(Continued)

FOREIGN PATENT DOCUMENTS

JP        2014-154105        8/2014
JP        2015-049654        3/2015
(Continued)

OTHER PUBLICATIONS

International Search Report for PCT Application No. PCT/JP2021/008773, mailed on Jun. 8, 2021.
(Continued)

*Primary Examiner* — William A Corum, Jr.
(74) *Attorney, Agent, or Firm* — Sughrue Mion, PLLC

(57) ABSTRACT

A server device according to an aspect of the present disclosure includes: at least one memory storing a set of instructions; and at least one processor configured to execute the set of instructions to: acquire biometric information of each of a plurality of employees working in a first company and registers the biometric information in a database; execute biometric authentication using biometric information of a first authentication target and the plurality of pieces of biometric information registered in the database, the biometric information of the first authentication target being included in a first authentication request transmitted from a first authentication terminal installed in a second company having a partnership with the first company; and manage so that the first authentication target has clocked in to the first company when authentication is successful.

4 Claims, 24 Drawing Sheets

SELECT STANDPOINT
WHEN ENTERING STORE

PLEASE SELECT WHETHER TO ENTER STORE AS EMPLOYEE OF AA COMPANY OR ENTER STORE AS GENERAL CUSTOMER

EMPLOYEE        GENERAL CUSTOMER

(51) Int. Cl.
  *G06Q 20/40*          (2012.01)
  *G06V 40/16*          (2022.01)

(56)                    References Cited

U.S. PATENT DOCUMENTS

| | | | |
|---|---|---|---|
| 2019/0311370 A1* | 10/2019 | Sekine | G07G 1/0036 |
| 2020/0097915 A1 | 3/2020 | Yamanaka | |
| 2020/0125709 A1* | 4/2020 | Gentry | G06F 16/5866 |
| 2020/0334682 A1* | 10/2020 | Kang | G06V 40/166 |
| 2021/0264374 A1* | 8/2021 | Vo | G06V 40/161 |
| 2021/0287472 A1* | 9/2021 | Niu | G06F 16/24558 |
| 2023/0046802 A1* | 2/2023 | Mori | G06F 16/2462 |

FOREIGN PATENT DOCUMENTS

| | | |
|---|---|---|
| JP | 2016-177803 | 10/2016 |
| JP | 2018-163475 A | 10/2018 |
| JP | 2020-030678 | 2/2020 |
| JP | 2020-107147 | 7/2020 |

OTHER PUBLICATIONS

English translation of Written opinion for PCT Application No. PCT/JP2021/008773, mailed on Jun. 8, 2021.
"Attendance management is the basis of the way of working change", PC-Webzine, Jun. 25, 2019, vol. 329, pp. 14-15.

* cited by examiner

Fig.4

PARTNER RESTAURANT 30-3

Figure 6:
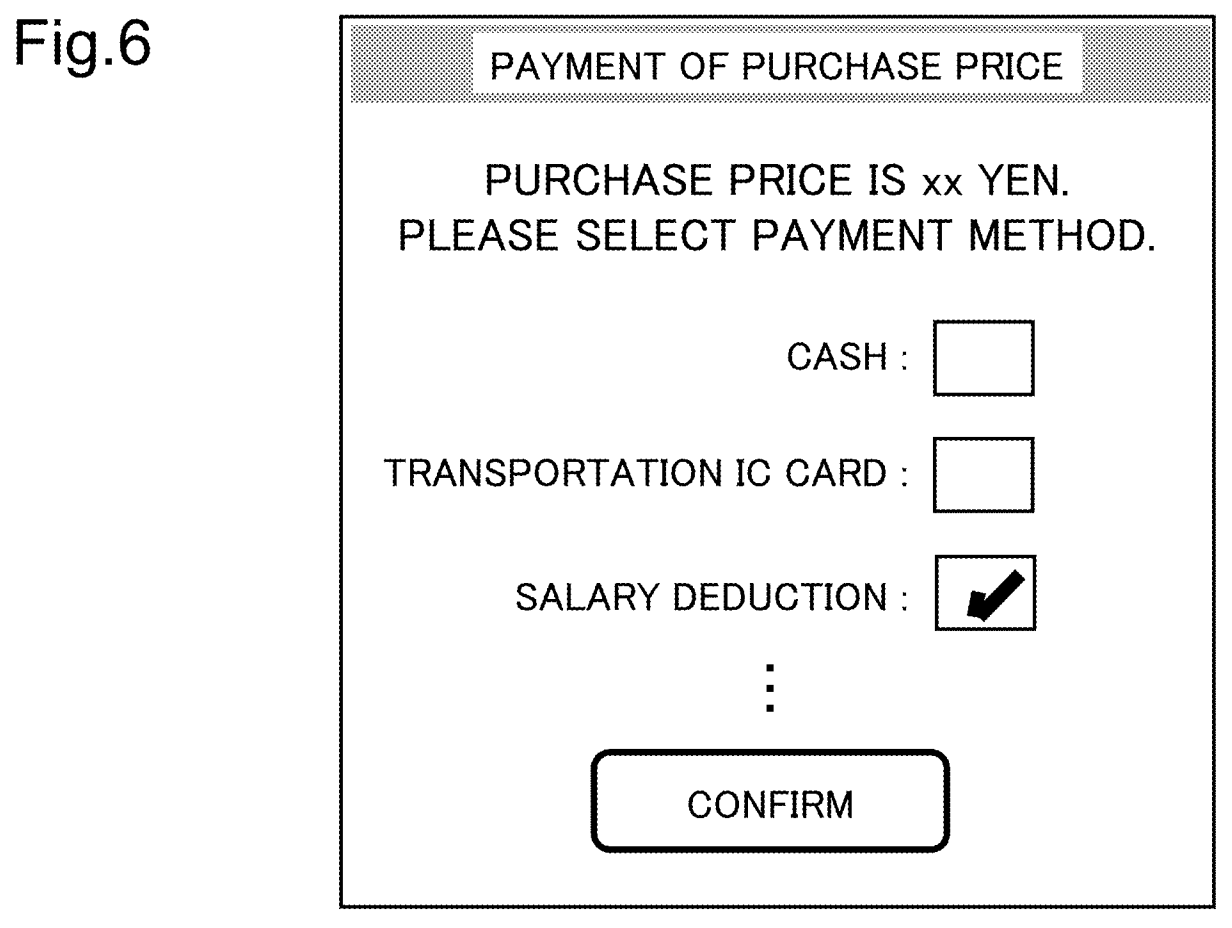

PAYMENT OF PURCHASE PRICE

PURCHASE PRICE IS xx YEN.
PLEASE SELECT PAYMENT METHOD.

CASH :

TRANSPORTATION IC CARD :

SALARY DEDUCTION :

. . .

CONFIRM

ITEM ORDER

WELCOME
PLEASE PRESS ITEM ORDER BUTTON.

ITEM ORDER

Fig.8A

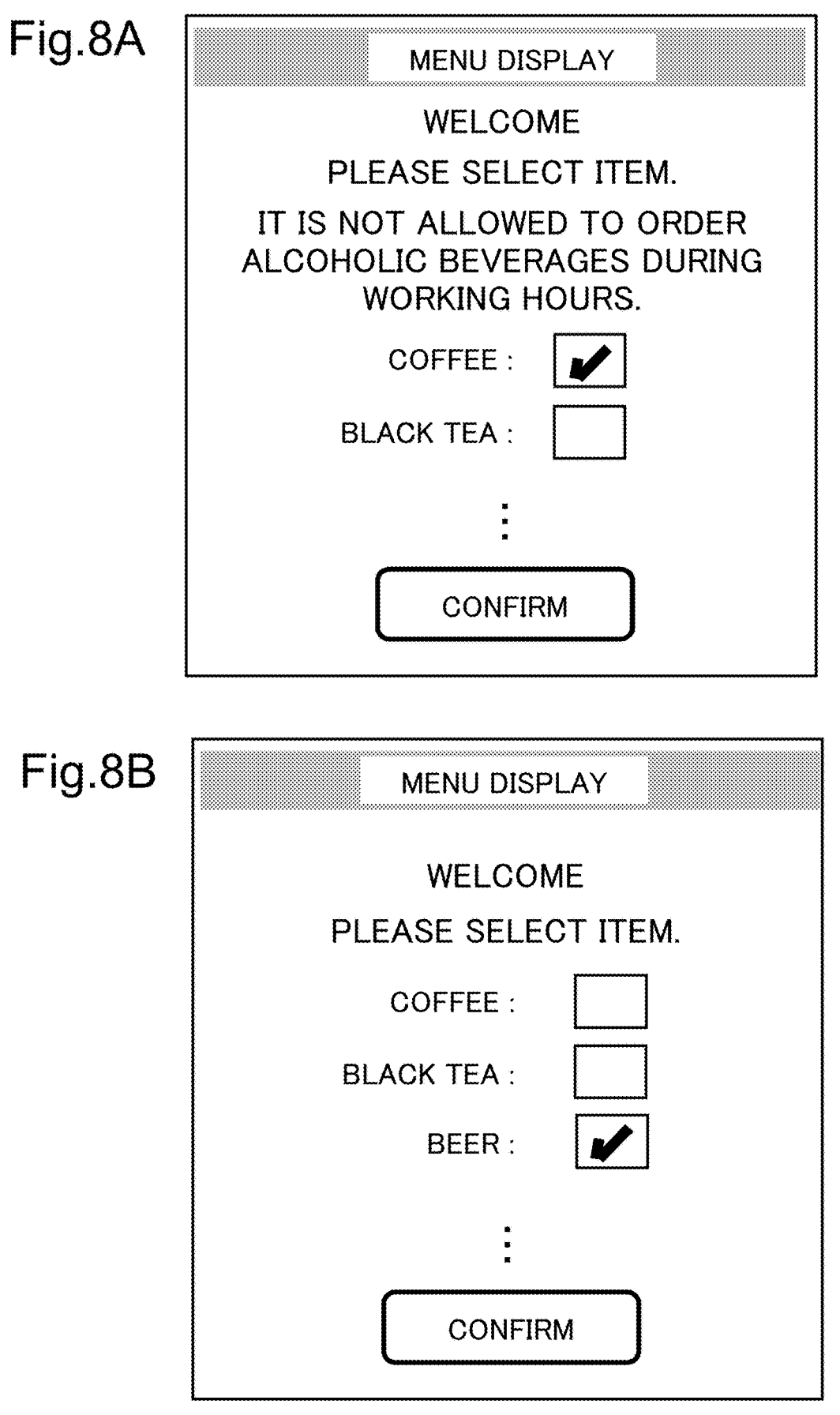

MENU DISPLAY

WELCOME

PLEASE SELECT ITEM.

IT IS NOT ALLOWED TO ORDER ALCOHOLIC BEVERAGES DURING WORKING HOURS.

COFFEE : ✔

BLACK TEA :

⋮

CONFIRM

Fig.8B

MENU DISPLAY

WELCOME

PLEASE SELECT ITEM.

COFFEE :

BLACK TEA :

BEER : ✔

⋮

CONFIRM

Fig.9A

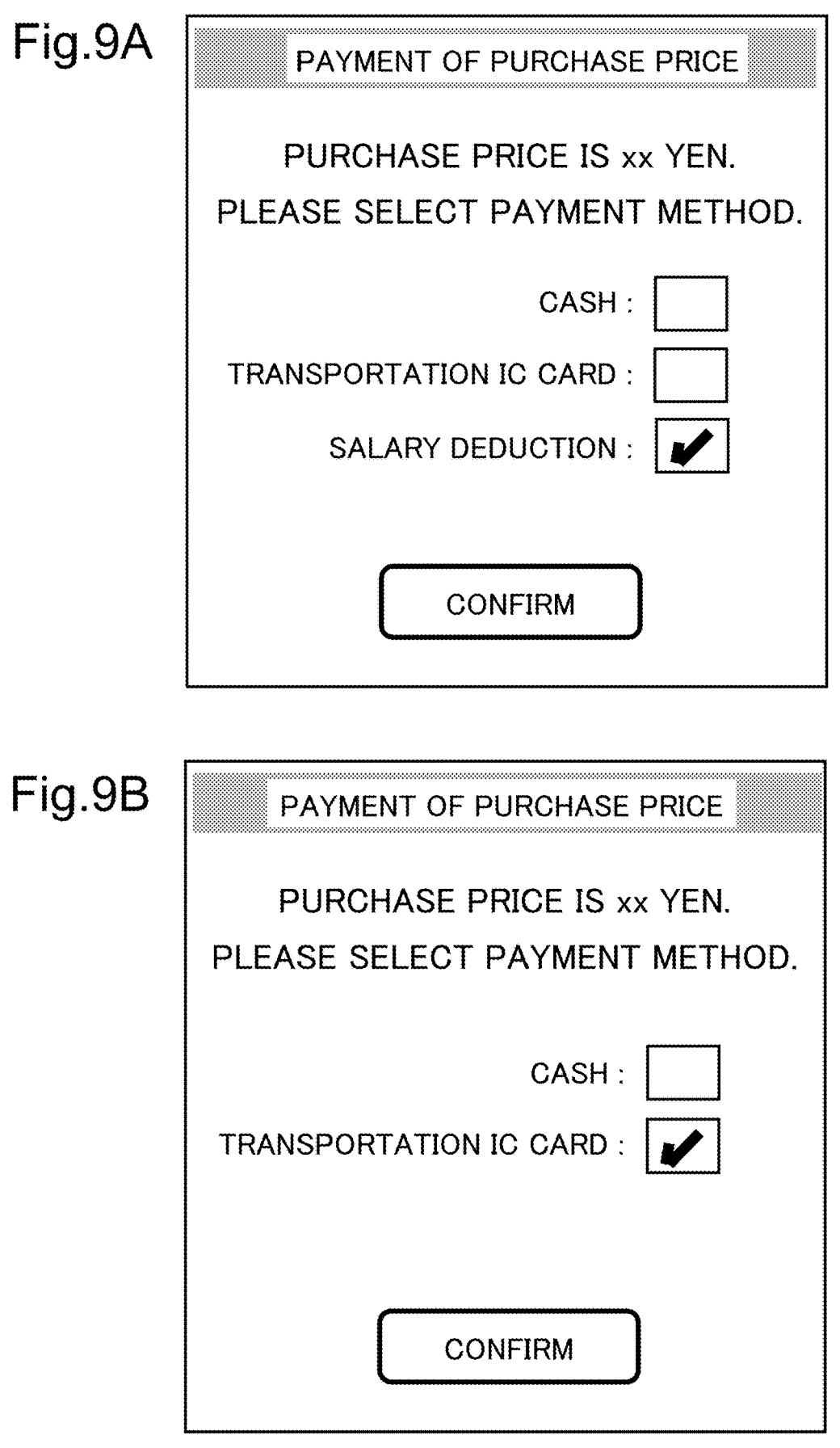

PAYMENT OF PURCHASE PRICE

PURCHASE PRICE IS xx YEN.
PLEASE SELECT PAYMENT METHOD.

CASH : ☐

TRANSPORTATION IC CARD : ☐

SALARY DEDUCTION : ☑

CONFIRM

Fig.9B

PAYMENT OF PURCHASE PRICE

PURCHASE PRICE IS xx YEN.
PLEASE SELECT PAYMENT METHOD.

CASH : ☐

TRANSPORTATION IC CARD : ☑

CONFIRM

Fig.11

AUTHENTICATION INFORMATION DATABASE

| EMPLOYEE ID | BIOMETRIC INFORMATION | |
|---|---|---|
| ID01 | FV1 | ⋮ |
| ID02 | FV2 | ⋮ |
| ID03 | FV3 | ⋮ |
| ID04 | FV4 | ⋮ |
| ⋯ | ⋯ | ⋯ |

Fig.12

EMPLOYEE INFORMATION DATABASE

| EMPLOYEE ID | NAME | DEPARTMENT | ⋮ |
|---|---|---|---|
| ID01 | NM1 | A1 | ⋮ |
| ID02 | NM2 | A2 | ⋮ |
| ID03 | NM3 | A3 | ⋮ |
| ID04 | NM4 | A4 | ⋮ |
| ⋯ | ⋯ | ⋯ | ⋯ |

Fig.14

ATTENDANCE MANAGEMENT DATABASE

| EMPLOYEE ID | ATTENDANCE STATE | CLOCK-IN TIME (Y1/M1/D1) | CLOCK-IN LOCATION (Y1/M1/D1) | CLOCK-OUT TIME (Y1/M1/D1) | CLOCK-IN TIME (Y1/M1/D2) | |
|---|---|---|---|---|---|---|
| ID01 | WORKING | H1:M1:S1 | HEAD OFFICE | — | — | ⁝ |
| ID02 | LEAVE WORK | H2:M2:S2 | PARTNER B | H5:M5:S5 | — | ⁝ |
| ID03 | WORKING | H3:M3:S3 | PARTNER A | — | — | ⁝ |
| ID04 | PAID | PAID | PAID | PAID | — | ⁝ |
| … | … | … | … | … | … | … |

PARTNER TERMINAL 30-3

601 COMMUNICATION CONTROL UNIT

602 ORDER PROCESSING UNIT

603 AUTHENTICATION REQUEST UNIT

604 STORAGE UNIT

Fig.23

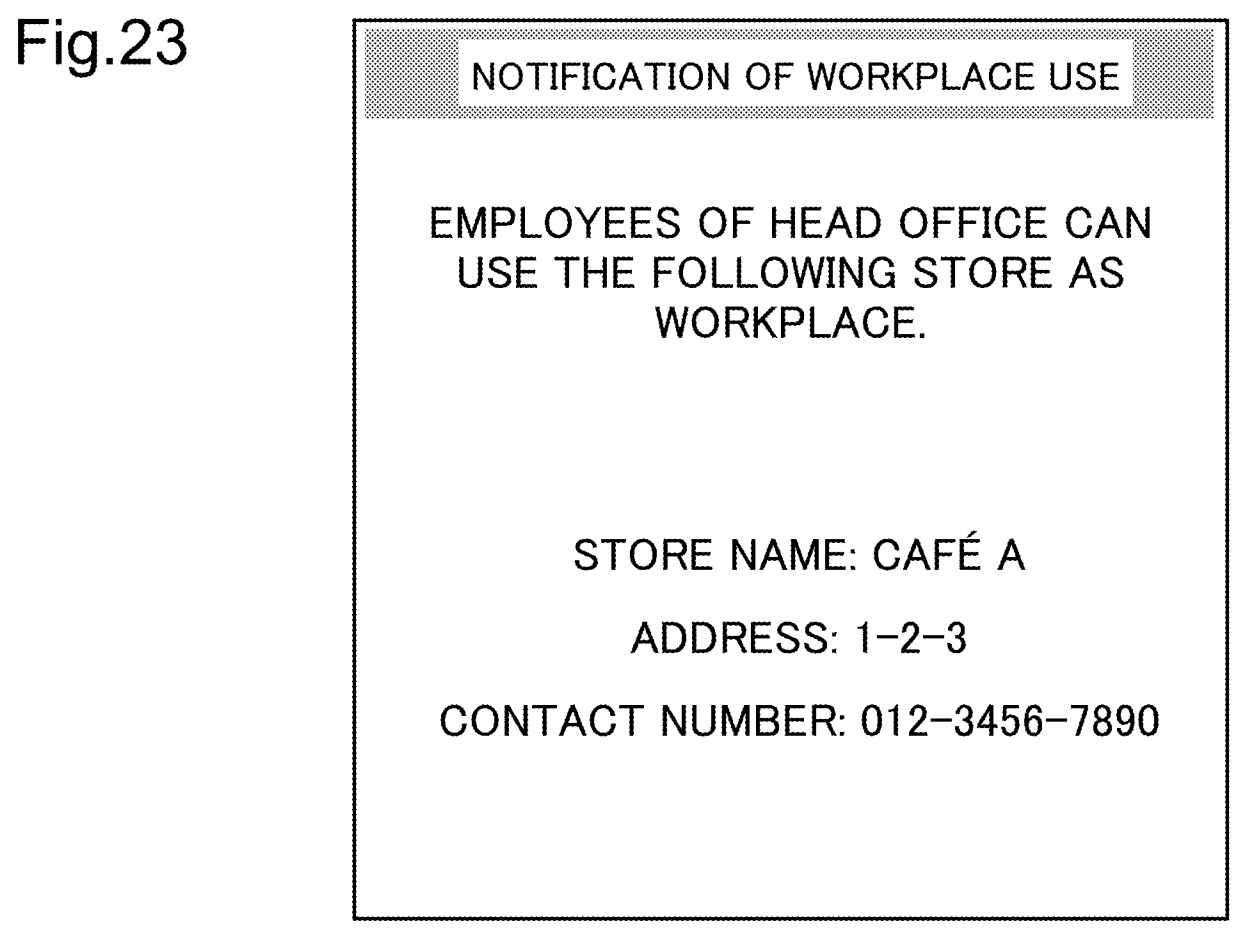

NOTIFICATION OF WORKPLACE USE

EMPLOYEES OF HEAD OFFICE CAN USE THE FOLLOWING STORE AS WORKPLACE.

STORE NAME: CAFÉ A

ADDRESS: 1-2-3

CONTACT NUMBER: 012-3456-7890

SELECT STANDPOINT WHEN ENTERING STORE

PLEASE SELECT WHETHER TO ENTER STORE AS EMPLOYEE OF AA COMPANY OR ENTER STORE AS GENERAL CUSTOMER

EMPLOYEE

GENERAL CUSTOMER

SERVER-BASED BIOMETRIC AUTHENTICATION SYSTEM FOR PARTNER BUSINESSES, SERVER DEVICE, AUTHENTICATION TERMINAL, CONTROL METHOD OF SERVER DEVICE, AND STORAGE MEDIUM

This application is a National Stage Entry of PCT/JP2021/008773 filed on Mar. 5, 2021, the contents of all of which are incorporated herein by reference, in their entirety.

TECHNICAL FIELD

The present invention relates to a server device, an authentication terminal, a system, a control method of a server device, and a storage medium.

BACKGROUND ART

There are technologies related to employee benefit services.

For example, PTL 1 describes that a highly convenient benefit service is provided to a worker. The system of PTL 1 includes a service provider terminal device of a service provider that provides a user with a predetermined object or service. The service provider terminal device obtains a user identifier of the user from the user, and sends the user identifier, the service amount, and the service provider identifier to the server device. The server device stores the user identifier and the auxiliary amount calculation information in advance in association with each other, and receives the user identifier, the service amount, and the service provider identifier from the service provider terminal device. The server device calculates the auxiliary amount using the auxiliary amount calculation information stored in association with the received user identifier and the received service amount. The server device transmits the auxiliary amount or the payment amount obtained by subtracting the auxiliary amount from the received service amount to the service provider terminal device.

In recent years, technology related to biometric authentication has been developed.

For example, PTL 2 describes providing an identity confirmation device using face authentication capable of accurately and reliably performing identity confirmation by registering a plurality of pieces of face data in advance and enabling automatic update of a latest face image at all times. The identification device of PTL 2 includes a human sensor, an imaging means, a liquid crystal screen, a registration means, and a central processing unit (CPU). The human sensor is activated by bringing the face closer. The imaging means is activated by the operation of the human sensor. The liquid crystal screen displays the face image obtained from the imaging means. The registration means pre-registers face data to be collated with the face screen of the liquid crystal screen. The CPU collates the face data of the registration means with the face image obtained from the imaging means, and outputs an authentication permission signal when the principal is confirmed. The registration means can register a plurality of pieces of face data, and replaces face data having the lowest authentication threshold among the registered face data with the latest face data obtained at the time of collation.

CITATION LIST

Patent Literature

PTL 1: JP 2018-163475 A
PTL 2: JP 2015-049654 A

SUMMARY OF INVENTION

Technical Problem

In recent years, the way of working of employees has been diversified. For example, an increasing number of companies employ a "free address" that works by selecting a free seat in a determined space without having a fixed seat in an office. Some companies have a "satellite office" that works in a place away from a head office building where they mainly work.

Here, there is a need to use a facility such as a restaurant (for example, a cafeteria) near the head office building as a "workplace". However, in order to use the restaurant as a "workplace", it is not possible to determine whether the user enters the restaurant as an "employee" or a normal "ordinary customer", and it is difficult to use the restaurant as a "workplace".

The problem cannot be solved by applying the technology disclosed in PTL 1 or PTL 2. This is because PTL 1 provides employees with menus provided by restaurants in town at a low price, and PTL 2 improves accuracy of identity verification in biometric authentication.

A main object of the present invention is to provide a server device, an authentication terminal, a system, a control method of a server device, and a storage medium that contribute to achieving various ways of working of employees and the like.

Solution to Problem

According to a first aspect of the present invention, there is provided a server device including a registration unit that acquires biometric information of each of a plurality of employees working in a first company and registers the biometric information in a database, and an authentication unit that executes biometric authentication using biometric information of a first authentication target included in a first authentication request transmitted from a first authentication terminal installed in a second company having a partnership with the first company and the plurality of pieces of biometric information registered in the database, and manages that the first authentication target has clocked in to the first company when authentication is successful.

According to a second aspect of the present invention, there is provided an authentication terminal that transmits an authentication request including biometric information of a authentication target who has visited a second company that is in a partnership with a first company to a server device that stores biometric information of each employee at work in the first company and processes the authentication request.

According to a third aspect of the present invention, there is provided an authentication terminal including an order processing unit that acquires intention of a user regarding an order of a product or a service provided by a second company having a partnership with a first company, and an authentication request unit that, when the user indicates an intention to order the product or service, transmits an authentication request including biometric information of the user to a server device that stores biometric information of each employee at work in the first company and processes the authentication request. The authentication request unit receives an authentication result determined as authentication success when the user is an employee of a first company and the user is in a working state for the first company.

According to a fourth aspect of the present invention, there is provided a system including an authentication terminal that is installed in a second company that is in a partnership with a first company, and a server device that is connected to the authentication terminal. The server device includes a registration unit that acquires biometric information of each of a plurality of employees working in the first company and registers the biometric information in a database, and an authentication unit that executes biometric authentication using biometric information of a authentication target included in an authentication request transmitted from the authentication terminal and the plurality of pieces of biometric information registered in the database, and manage that the authentication target has clocked in to the first company when authentication is successful.

According to a fifth aspect of the present invention, there is provided a control method of a server device, including with the server device, acquiring biometric information of each of a plurality of employees working in a first company, registering the acquired biometric information in a database, executing biometric authentication using biometric information of a first authentication target included in a first authentication request transmitted from a first authentication terminal installed in a second company having a partnership with the first company and the plurality of pieces of biometric information registered in the database, and managing that the first authentication target has clocked in to the first company when authentication is successful.

According to a sixth aspect of the present invention, there is provided a non-transitory computer-readable storage medium storing a program for causing a computer mounted in a server device to execute acquiring biometric information of each of a plurality of employees working in a first company, registering the acquired biometric information in a database, executing biometric authentication using biometric information of a first authentication target included in a first authentication request transmitted from a first authentication terminal installed in a second company having a partnership with the first company and the plurality of pieces of biometric information registered in the database, and managing that the first authentication target has clocked in to the first company when authentication is successful.

Advantageous Effects of Invention

According to each aspect of the present invention, a server device, an authentication terminal, a system, a control method of a server device, and a storage medium that contribute to achieving various ways of working of employees and the like are provided. The effect of the present invention is not limited to the above. According to the present invention, other effects may be exhibited instead of or in addition to the effects.

BRIEF DESCRIPTION OF DRAWINGS

FIG. 4 is a diagram for explaining a configuration of a partner restaurant according to the first example embodiment.

FIG. 6 is a diagram for explaining a schematic operation of the authentication system according to the first example embodiment.

FIG. 8A is a diagram for explaining a schematic operation of the authentication system according to the first example embodiment.

FIG. 8B is a diagram for explaining a schematic operation of the authentication system according to the first example embodiment.

FIG. 9A is a diagram for explaining a schematic operation of the authentication system according to the first example embodiment.

FIG. 9B is a diagram for explaining a schematic operation of the authentication system according to the first example embodiment.

FIG. 11 is a diagram illustrating an example of an authentication information database according to the first example embodiment.

FIG. 12 is a diagram illustrating an example of an employee information database according to the first example embodiment.

FIG. 14 is a diagram illustrating an example of an attendance management database according to the first example embodiment.

FIG. 23 is a diagram for explaining an operation of a head office terminal according to a modification of the disclosure of the present application.

EXAMPLE EMBODIMENT

Figure 1:
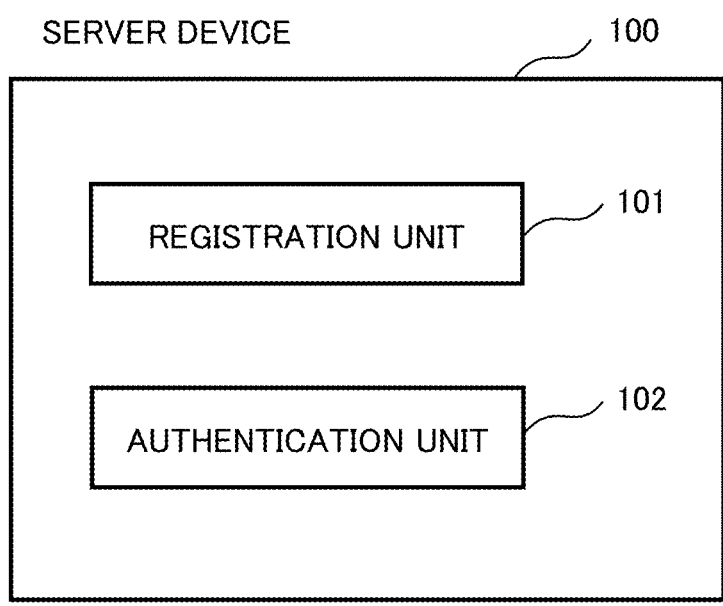
FIG. 1 is a diagram for explaining an outline of an example embodiment.

First, an outline of an example embodiment will be described. The reference numerals in the drawings attached to this outline are attached to each element for convenience as an example for assisting understanding, and the description of this outline is not intended to be any limitation. In a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

A server device 100 according to the example embodiment includes a registration unit 101 and an authentication unit 102 (see FIG. 1). The registration unit 101 acquires biometric information on each of a plurality of employees working for a first company and registers the biometric information in a database. The authentication unit 102 performs biometric authentication using the plurality of pieces of biometric information registered in the database and biometric information which pertains to a first authentication target and which is included in a first authentication request transmitted from a first authentication terminal installed in a second company that is in a partnership with the first company. When the authentication is successful, the authentication unit 102 regards the first authentication target as having clocked in to work at the first company.

The server device 100 allows a second company (restaurant or the like) located around the first company (company or the like) to be used as a "workplace" for an employee or a worker working for the first company. The server device 100 grasps that the employee has entered the store of the partner for the purpose of working by biometric authentication using the authentication request acquired from the first authentication terminal installed in the partner. As a result, the employees can perform their work at a place different from their own facilities or buildings. That is, the server device 100 can achieve various ways of working of employees and the like.

Hereinafter, specific example embodiments will be described in more detail with reference to the drawings.

First Example Embodiment

A first example embodiment will be described in more detail with reference to the drawings.

Figure 2:
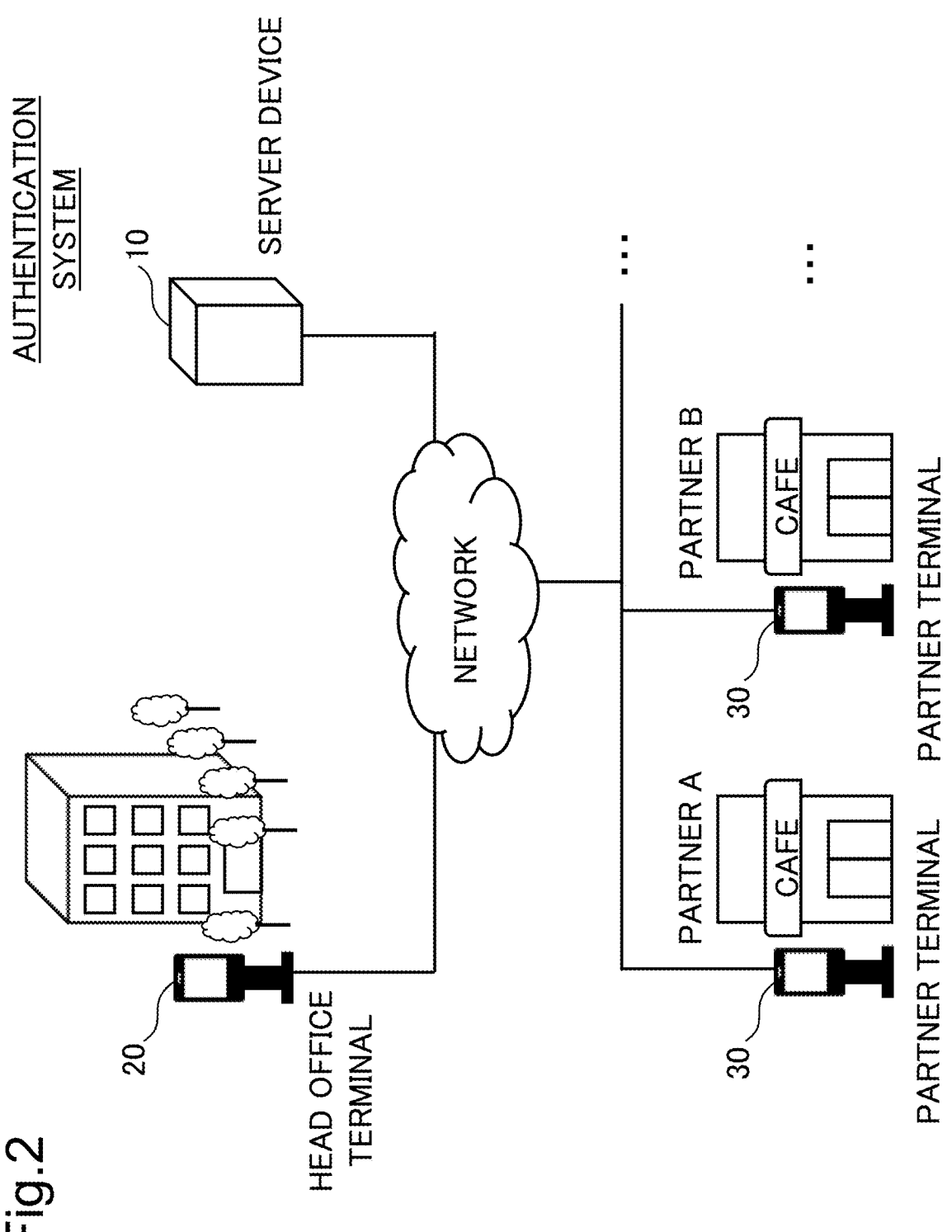
FIG. 2 is a diagram illustrating an example of a schematic configuration of an authentication system according to a first example embodiment.

FIG. 2 is a diagram illustrating an example of a schematic configuration of an authentication system according to the first example embodiment. The authentication system includes a first company and a second company having a partnership with the first company. In the example of FIG. 2, a restaurant located around a company (first company) corresponds to the second company. A cafeteria or the like around a building (hereinafter, it is referred to as a head office building) of a company or the like is the second company.

As described above, a company and a restaurant are in a partnership, and various benefits can be obtained when employees or the like of the company use the restaurant of the partner. For example, an employee of the company can use a restaurant of a partner as a "workplace".

The employees of the partner company enter a restaurant and perform company upon receiving biometric authentication (for example, face authentication). The employee can complete payment related to product purchase by face authentication.

As illustrated in FIG. 2, the authentication system according to the first example embodiment includes a server device 10, a head office terminal 20, and a partner terminal 30.

The devices illustrated in FIG. 2 are connected to each other. For example, the server device 10 and the authentication terminal (head office terminal 20 and partner terminal 30) are connected by wired or wireless communication means, and are configured to be able to communicate with each other.

The server device 10 is a device that provides a service related to biometric authentication. The server device 10 stores biometric information of each of a plurality of employees working in a company (first company). The server device 10 receives an authentication request from the authentication terminal (head office terminal 20 and partner terminal 30). The server device 10 executes biometric authentication using the stored biometric information and specifies the authentication target. The server device 10 transmits the authentication result (authentication success, authentication failure) to the authentication terminal. The server device 10 may be installed in the head office building or may be installed on a cloud.

Figure 3:
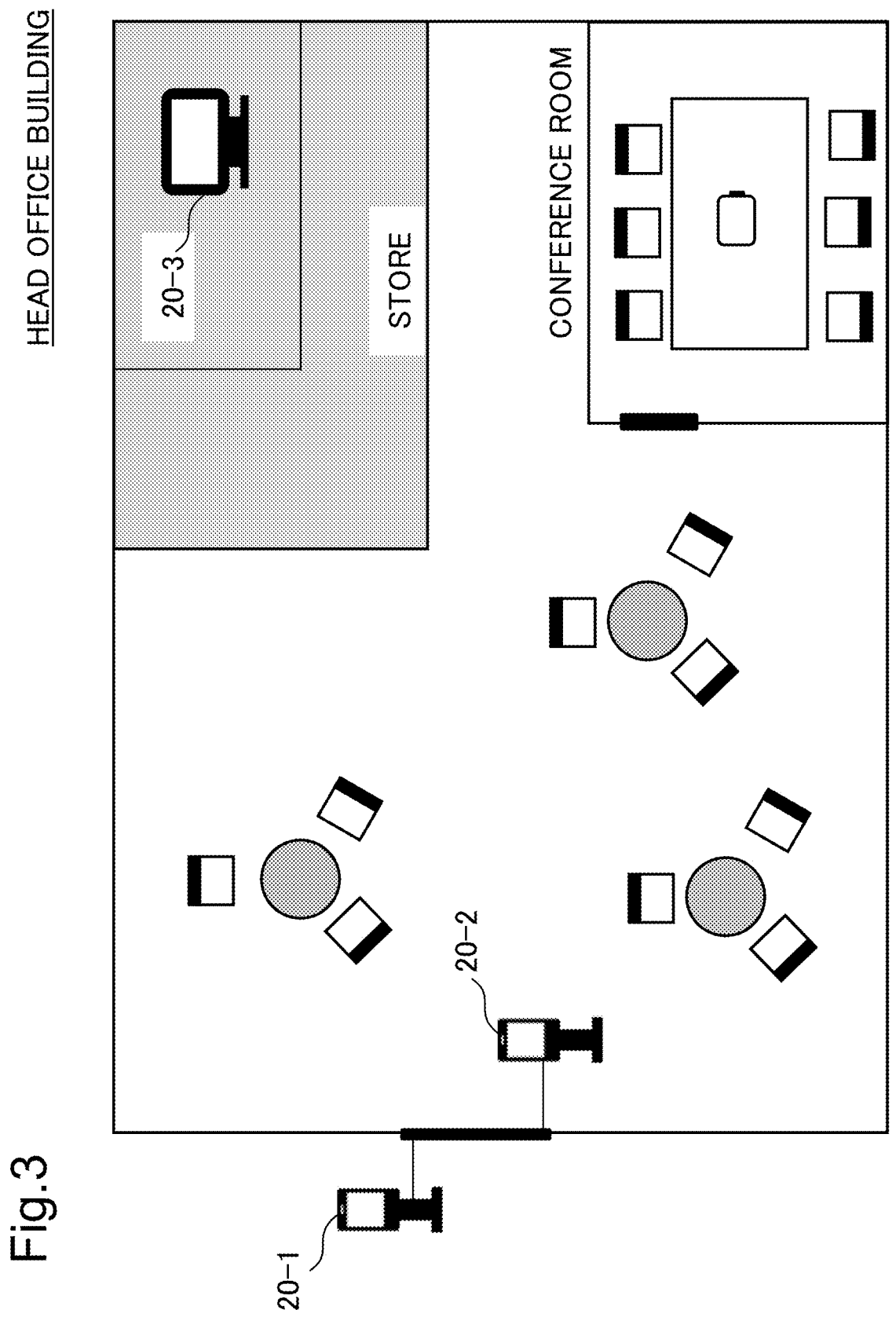
FIG. 3 is a diagram for explaining a configuration of a head office building according to the first example embodiment.

The head office terminal 20 is disposed in each place of the head office building. For example, as illustrated in FIG. 3, a head office terminal 20-1 and a head office terminal 20-2 are installed near an entrance of a building. Alternatively, a head office terminal 20-3 is installed in a store or a dining room.

The head office terminals 20-1 and 20-2 are authentication terminals that control entrance and exit of employees to and from the head office building. When the authentication target is successfully authenticated, the head office terminals 20-1 and 20-2 permit the authentication target (the authentication target determined to be successfully authenticated) to pass through the door or the gate.

The head office terminal 20-3 is an authentication terminal for making a payment for a product purchased by an employee or a service provided by the employee. The head office terminal 20-3 transmits the biometric information of the authentication target and the payment information (payment, purchase date, payment method, etc.) related to the purchased product or the like to the server device 10. The server device 10 identifies a product purchaser by biometric authentication and processes payment information.

Figure 4:
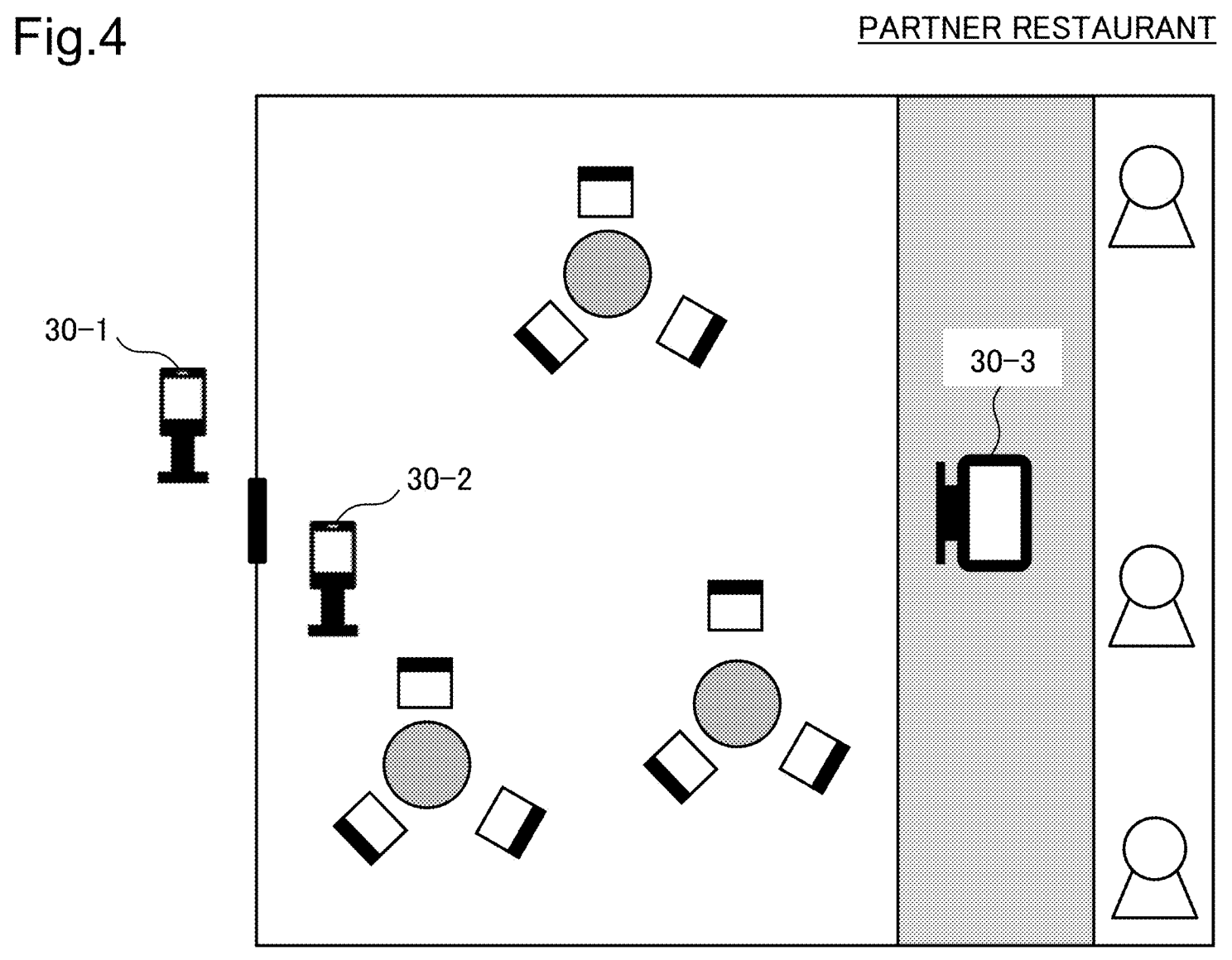

The partner terminal 30 is arranged at each place of the partner restaurant. For example, as illustrated in FIG. 4, a partner terminal 30-1 and a partner terminal 30-2 are installed near an entrance of a restaurant. Alternatively, a partner terminal 30-3 is installed in a counter that delivers products.

The partner terminal 30-1 is an authentication terminal for grasping an employee who enters a restaurant of the partner. The employee who wants to use the restaurant of the partner as a workplace is biometrically authenticated by the partner terminal 30-1, and entry (clock-in) is managed. Similarly, an employee who uses the restaurant of the partner as a workplace is biometrically authenticated by the partner terminal 30-2, and leaves (check-out) the restaurant is managed.

The partner terminal 30-3 is an authentication terminal for settlement of a product purchased by an employee at a partner restaurant. The partner terminal 30-3 transmits payment information regarding the product or the like purchased by the employee to the server device 10. The server device 10 processes the payment information.

FIG. 2 is an example and is not intended to limit the configuration and the like of the authentication system of the disclosure of the present application. For example, the authentication system may include two or more server devices 10. The authentication system may include at least one authentication terminal.

[Outline of System Operation]

Next, a schematic operation of the authentication system according to the first example embodiment will be described.

[User Registration]

Figure 5:
FIG. 5 is a diagram for explaining a schematic operation of the authentication system according to the first example embodiment.

As illustrated in FIG. 5, an employee at work in the head office building performs user registration in advance. The employee registers his/her own biometric information and personal information in the server device 10. For example, the employee operates his/her terminal to register the biometric information in the server device 10.

The biometric information of the user includes, for example, data (feature value) calculated from physical characteristics unique to an individual, such as a face, a fingerprint, a voiceprint, and a pattern of a vein, a retina, and an iris of a pupil. Alternatively, the biometric information of the user may be image data such as a face image and a fingerprint image. The biometric information of the user may include the physical characteristics of the user as information. In the first example embodiment, the biometric information is a face image or a feature value generated from the face image.

The personal information of the employee includes a name, a gender, a department to which the employee belongs, an employee identifier (ID), a contact address, and the like.

The server device 10 associates the biometric information of the employee with the employee ID to store the information in an authentication information database (DB; Database). The server device 10 stores the biometric information of each of the plurality of employees using the authentication information database. The server device 10 stores the employee ID, the name of the employee, the department to which the employee belongs, and the like in the employee information database in association with each other. Details of the authentication information database and the employee information database will be described later.

[Biometric Authentication at Head Office Building]

The employee who has clocked in to work in the head office building moves in front of the head office terminal 20-1. The head office terminal 20-1 acquires the biometric information (for example, a face image) of the employee and transmits an authentication request including the acquired biometric information and terminal ID to the server device 10.

The terminal ID is identification information for identifying an authentication terminal (head office terminal 20 and partner terminal 30). As the terminal ID, a media access control (MAC) address, an Internet protocol (IP) address, or the like of each authentication terminal can be used. The terminal ID is shared between the server device 10 and the authentication terminal by an arbitrary means.

The server device 10 specifies a transmission source of the authentication request based on the terminal ID included in the authentication request. The server device 10 determines that the transmission source of the authentication request is the head office terminal 20-1 based on the terminal ID.

The server device 10 executes biometric authentication (collation processing) using the biometric information included in the authentication request and the biometric information registered in the authentication information database. The server device 10 transmits an authentication result (authentication success, authentication failure) to the head office terminal 20-1. When the biometric authentication is successful, the server device 10 stores the authentication time in the attendance management database as the clock-in time of the employee. Details of the attendance management database will be described later.

When the authentication success is received, the head office terminal 20-1 opens the door or the gate and permits the authentication target to pass. When the authentication failure is received, the head office terminal 20-2 closes the door or the gate and rejects passage of the authentication target.

Since the basic operation related to the head office terminal 20-2 can be similar to that of the head office terminal 20-1, the description thereof will be omitted. The server device 10 stores the authentication time of the head office terminal 20-2 as the clock-out time of the employee in the attendance management database.

An employee who purchases products or receives services at stores or the like make payments using the head office terminal 20-3. For example, the head office terminal 20-3 specifies a product by a barcode or the like and calculates a product purchase price. Thereafter, the head office terminal 20-3 displays a menu that allows the employee to select a payment method (see FIG. 6).

When the employee selects "payment in cash" or "payment by transportation integrated circuit (IC) card", the head office terminal 20-3 performs payment by the selected payment means. With respect to these payment means, existing processing can be applied, and since it is obvious to those skilled in the art, detailed description thereof will be omitted.

When the employee selects the "salary deduction", the head office terminal 20-3 acquires the biometric information (for example, a face image) of the employee. The head office terminal 20-3 transmits an authentication request including the terminal ID, the payment information, and the biometric information to the server device 10.

The server device 10 specifies a transmission source of the authentication request based on the terminal ID. The server device 10 determines that the transmission source of the authentication request is the head office terminal 20-3 based on the terminal ID.

The server device 10 executes biometric authentication (collation processing; 1 to N match, N is a positive integer, and so on) using the biometric information included in the authentication request and the biometric information registered in the authentication information database. When the employee is specified by the collation processing, the server device 10 performs the payment processing of the product purchase price by the payment method (salary deduction) included in the authentication request.

If the payment processing succeeds, the server device 10 notifies the head office terminal 20-3 of the authentication success. If the biometric authentication or the payment processing fails, the server device 10 notifies the head office terminal 20-3 of the authentication failure.

When the authentication success is received, the head office terminal 20-3 notifies the employee that the payment of the fee has been completed. When the authentication failure is received, the head office terminal 20-3 prompts selection of other payment means or reacquires biometric information.

[Biometric Authentication at Partner Restaurant]

The employee who wants to use the partner restaurant as a workplace moves in front of the partner terminal 30-1. The partner terminal 30-1 acquires the biometric information of the employee and transmits an authentication request including the biometric information and the terminal ID to the server device 10. When the biometric authentication succeeds, the server device 10 handles the authentication time of the partner terminal 30-1 as the clock-in time and stores the same in the clock-in management database.

The employee who uses the partner restaurant as a workplace moves in front of the partner terminal 30-2. The partner terminal 30-2 acquires the biometric information of the employee and transmits an authentication request including the biometric information and the terminal ID to the server device 10. When the biometric authentication succeeds, the server device 10 handles the authentication time of the partner terminal 30-2 as the clock-out time and stores the authentication time in the clock-in management database.

In a case where an employee who is taking a break time or an employee who is on paid leave enters a restaurant of a partner as a general customer and leaves the restaurant, it is not necessary to receive biometric authentication by the partner terminals 30-1 and 30-2.

Figure 7:
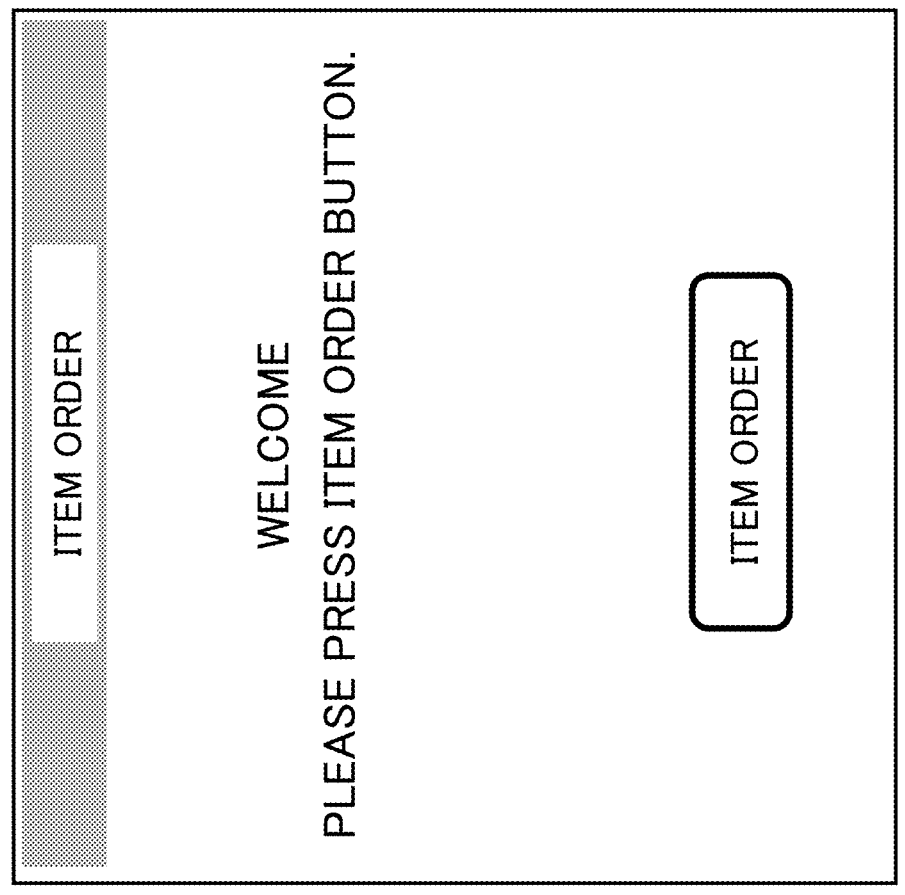
FIG. 7 is a diagram for explaining a schematic operation of the authentication system according to the first example embodiment.

The partner terminal 30-3 is a terminal for both ordering and payment of a product or the like. The partner terminal 30-3 displays a graphical user interface (GUI) as illustrated in FIG. 7. When an "item order" button is pressed, the partner terminal 30-3 acquires the biometric information of the user.

The partner terminal 30-3 transmits an authentication request including the acquired biometric information and terminal ID to the server device 10.

The server device 10 specifies a transmission source of the authentication request based on the terminal ID. The server device 10 determines that the transmission source of the authentication request is the partner terminal 30-3 (order terminal of the partner restaurant) based on the terminal ID.

The server device 10 executes biometric authentication (collation processing) using the biometric information included in the authentication request and the biometric information registered in the authentication information database. If the authentication target is an "employee at work", the server device 10 transmits the authentication success to the partner terminal 30-3. In a case where the authentication target is an employee at work, the server device 10 transmits an affirmative response including the employee ID of the employee to the partner terminal 30-3.

If the authentication target is not an employee at work, the server device 10 transmits the authentication failure to the partner terminal 30-3.

The partner terminal 30-3 changes the menu to be provided to the user according to the authentication result. Specifically, in a case where the user is an employee at work (in a case of authentication success), the partner terminal 30-3 does not display a product irrelevant to the company execution or an inappropriate product as a menu that can be provided. For example, the partner terminal 30-3 does not display alcoholic beverages as a menu as illustrated in FIG. 8A. On the other hand, in a case where the user is not an employee at work (in a case of authentication failure), the partner terminal 30-3 displays a menu as illustrated in FIG. 8B.

When the user selects a product and desires payment, the partner terminal 30-3 acquires a payment method desired by the employee. Also in this case, the partner terminal 30-3 changes the GUI to be displayed according to the authentication result.

Specifically, in a case where the user is an employee at work (in a case of authentication success), the partner terminal 30-3 displays a GUI as illustrated in FIG. 9A and acquires a payment method desired by the employee. When the employee desires the "salary deduction", the partner terminal 30-3 transmits a payment processing request including the terminal ID, the payment information, and the employee ID to the server device 10. The server device 10 performs payment processing (salary deduction processing) for the employee corresponding to the employee ID.

For payment of users other than employees, the partner terminal 30-3 may display a GUI without "salary deduction" as illustrated in FIG. 9B.

Next, details of each device included in the authentication system according to the first example embodiment will be described.

[Server Device]

Figure 10:
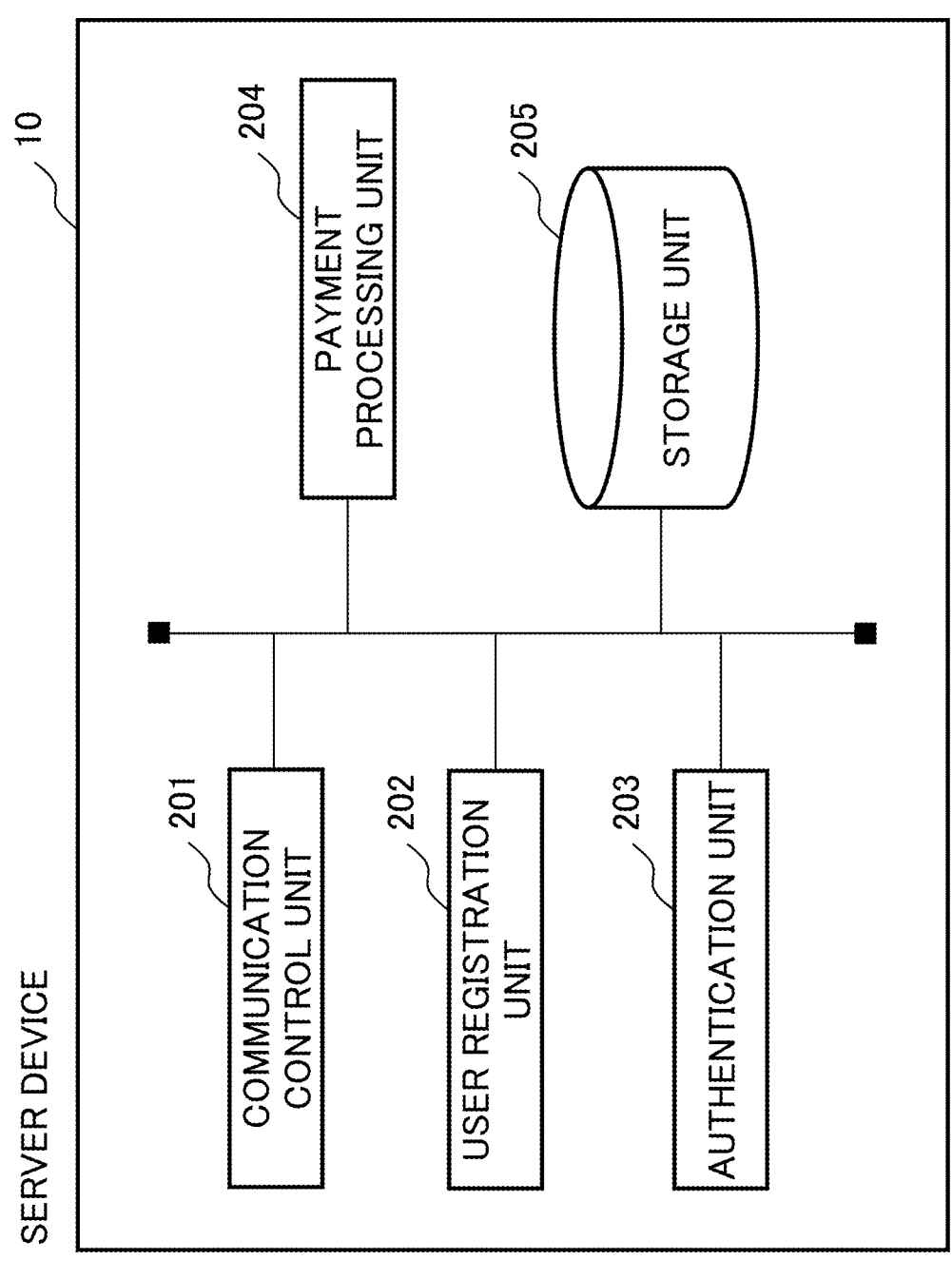
FIG. 10 is a diagram illustrating an example of a processing configuration of a server device according to the first example embodiment.

FIG. 10 is a diagram illustrating an example of a processing configuration (processing module) of the server device 10 according to the first example embodiment. Referring to FIG. 10, the server device 10 includes a communication control unit 201, a user registration unit 202, an authentication unit 203, a payment processing unit 204, and a storage unit 205.

The communication control unit 201 is a means that controls communication with other devices. For example, the communication control unit 201 receives data (packet) from the head office terminal 20. The communication control unit 201 transmits data to the head office terminal 20. The communication control unit 201 delivers data received from another device to another processing module. The communication control unit 201 transmits data acquired from another processing module to another device. In this manner, the another processing module transmits and receives data to and from other devices via the communication control unit 201.

The user registration unit 202 is a means that achieves the user registration described above. The user registration unit 202 acquires biometric information on each of a plurality of employees working for a company (first company) and registers the biometric information in the authentication information database.

The user registration unit 202 acquires the biometric information and the personal information of the employee using an arbitrary means. For example, the user registration unit 202 displays a graphical user interface (GUI) or an input form for acquiring biometric information and personal information on a terminal possessed by an employee, and acquires these pieces of information. Alternatively, an employee desiring registration may pass an external storage medium storing the biometric information or the like to the company management department of the head office, and an employee or the like of the management department may input the biometric information and the personal information to the server device 10 using the external storage medium.

The user registration unit 202 generates a feature value (a feature vector including a plurality of feature values) from the acquired face image. An existing technology can be used for the feature value extraction processing, and thus a detailed description thereof will be omitted. For example, the user registration unit 202 extracts eyes, a nose, a mouth, and the like as feature points from the face image. Thereafter, the user registration unit 202 calculates the position of each feature point and the distance between the feature points as feature values, and generates a feature vector (vector information characterizing the face image) including a plurality of feature values.

The user registration unit 202 stores the employee ID and the biometric information (for example, the feature value) in the authentication information database in association with each other (see FIG. 11). In this manner, the user registration unit 202 acquires the biometric information of each of the plurality of employees and stores the acquired biometric information in the authentication information database.

The authentication information database illustrated in FIG. 11 is an example and is not intended to limit items and the like to be stored. For example, biometric information related to a face image may be stored in the authentication information database instead of or in addition to the feature value.

The user registration unit 202 stores the personal information (employee ID, name, gender, division to which they belong, etc.) acquired from the employee in the employee information database (see FIG. 12).

The employee information database illustrated in FIG. 12 is an example, and is not intended to limit items and the like to be stored. For example, an account number, a contact address, or the like to which the salary is transferred may be stored in the employee information database.

The authentication unit 203 is a means that processes the authentication request received from the authentication terminal.

The authentication unit 203 specifies a transmission source of the authentication request based on the terminal ID included in the authentication request. The authentication unit 203 changes the processing according to the type of the transmission source. Specifically, with respect to the authentication request received from the head office terminal 20-1 or the partner terminal 30-1, the authentication unit 203 performs processing related to clock-in management of employees. For the authentication request received from the head office terminal 20-2 or the partner terminal 30-2, the authentication unit 203 performs processing related to attendance management of the employee. With respect to the authentication request received from the head office terminal 20-3 or the partner terminal 30-3, the authentication unit 203 performs processing related to payment of a product or the like purchased by the employee.

Figure 13:
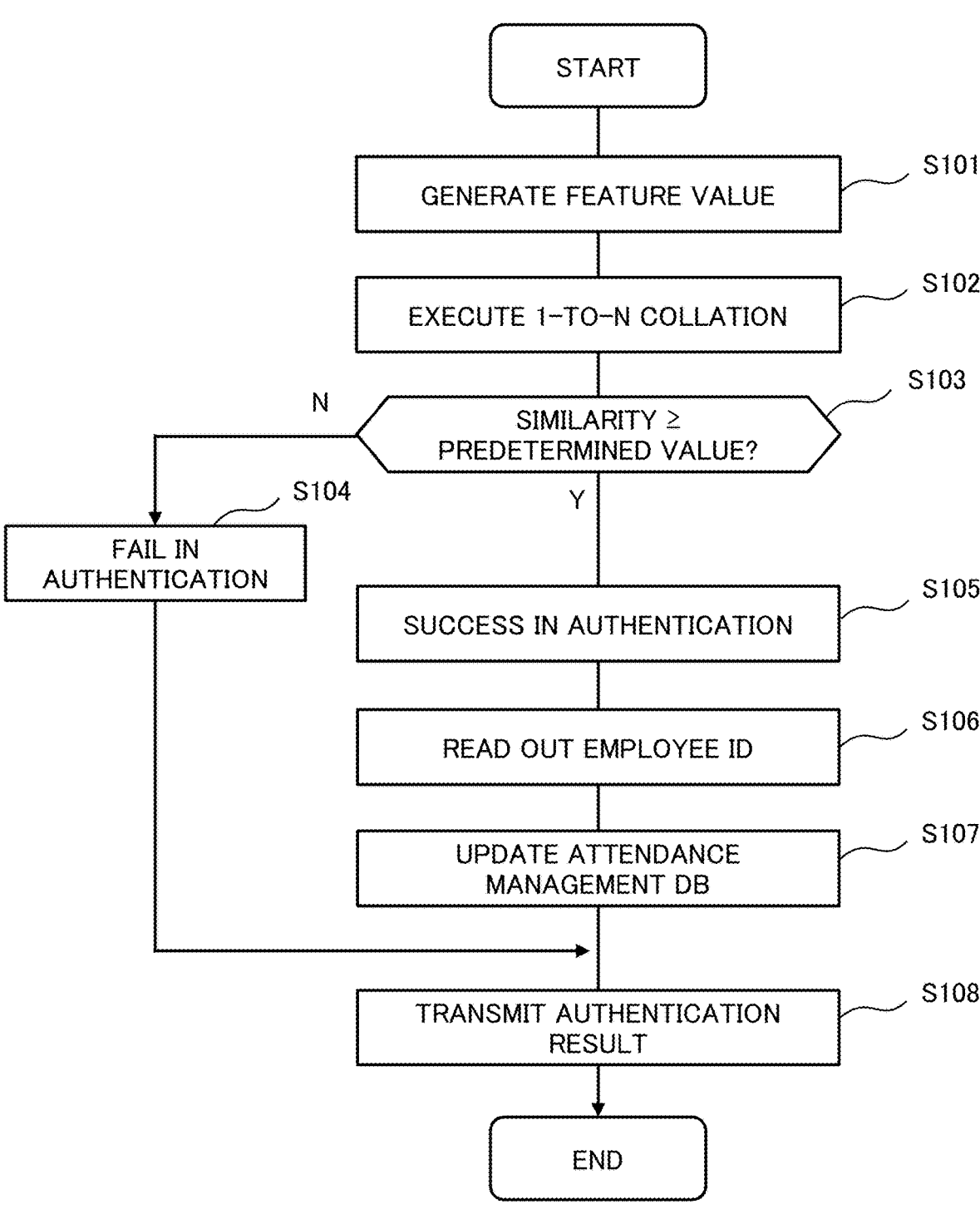
FIG. 13 is a diagram for explaining an operation of an authentication unit according to the first example embodiment.

First, with reference to FIG. 13, the operation of the authentication unit 203 with clock-in management will be described.

The authentication unit 203 extracts the biometric information (for example, a face image) from the received authentication request. The authentication unit 203 generates a feature value from the acquired face image (step S101).

In step S102, the authentication unit 203 sets the generated feature value as the feature value on the collation side and the feature value stored in the authentication information database as the feature value on the registration side, and executes the 1-to-N collation. Specifically, the authentication unit 203 calculates the similarity between the feature value on the collation side and the feature value of each of the plurality of registration sides. A chi-square distance, a Euclidean distance, or the like can be used as the similarity. The similarity is lower as the distance is longer, and the similarity is higher as the distance is shorter.

The authentication unit 203 determines whether there is a feature value having a similarity to the feature value of the collation target equal to or more than a predetermined value among the plurality of feature values registered in the authentication information database (step S103).

When such a feature value does not exist (step S103: No branch), the authentication unit 203 determines that the authentication fails (step S104).

When the feature value as described above exists (step S103: Yes branch), the authentication unit 203 determines that the authentication is successful (step S105).

Thereafter, the authentication unit 203 specifies an entry having a feature value having the highest similarity to the feature value on the collation side from among the entries of the authentication information database, and reads the relevant employee ID (step S106).

The authentication unit 203 updates the attendance management database using the read employee ID (step S107).

As illustrated in FIG. 14, the attendance management database includes a work state field, a clock-in time field, a clock-in location field, and a clock-out time field. The work state field is a field for storing the work state of each employee on the current day (current time). For example, the work state of an employee whose clock-in time is stored in the attendance management database and whose clock-out time is not stored in the attendance management database is set to "working". The work state of the employee whose clock-out time is stored is set to "leave work", and the work state of the employee who has obtained paid time-off is set to "paid".

A server or the like different from the server device 10 manages whether an employee acquires a paid time-off on an operating day of the head office. The server device 10 inquires of the server whether each employee has acquired a paid time-off, thereby being able to know the employee (employee ID) who has acquired a paid time-off. Attendance management of employees is different from the gist of the present application, and thus a more detailed description thereof will be omitted.

The authentication unit 203 searches the attendance management database using the read employee ID as a key, and writes the authentication time in the clock-in time field of the entry relevant to the employee ID. The authentication unit 203 sets the work state of the employee relevant to the employee ID to "working". Further, the authentication unit 203 specifies the clock-in location of the employee from the terminal ID included in the authentication request, and writes the specified clock-in location in the clock-in location field.

The authentication unit 203 transmits the authentication result to the authentication terminal (head office terminal 20 and partner terminal 30) (step S108). When the authentication fails, the authentication unit 203 transmits a negative response indicating the failure to the authentication terminal. When the authentication is successful, the authentication unit 203 transmits an affirmative response indicating the success to the authentication terminal.

In this manner, the authentication unit 203 receives the first authentication request transmitted from the first authentication terminal (the partner terminal 30-1) installed in a restaurant (the second company) having a partnership with the company (the first company). The authentication unit 203 executes biometric authentication using the biometric information of the first authentication target included in the first authentication request and a plurality of pieces of biometric information registered in the authentication information database. When the biometric authentication is successful, the authentication unit 203 regards the first authentication target as having clocked in to work at the first company.

Since the operation of the authentication unit 203 accompanying the clock-in management is basically the same as the operation of the authentication unit 203 accompanying the attendance management, a detailed description thereof will be omitted. In a case where the authentication request is received from the head office terminal 20-2 and the partner terminal 30-2 and the biometric authentication is successful, the authentication unit 203 may write the authentication time in the clock-out time of the attendance management database. The authentication unit 203 sets the work state of the person who has succeeded the authentication to "leave work" and stores the work state in the attendance management database.

That is, the authentication unit 203 receives a second authentication request transmitted from the second authentication terminal (the partner terminal 30-2) installed in the partner restaurant. The authentication unit 203 executes biometric authentication using the biometric information of a second authentication target included in the second authentication request and a plurality of pieces of biometric information registered in the authentication information database. When the biometric authentication is successful, the authentication unit 203 regards the second authentication target as having clocked out of work at the first company.

Figure 15:
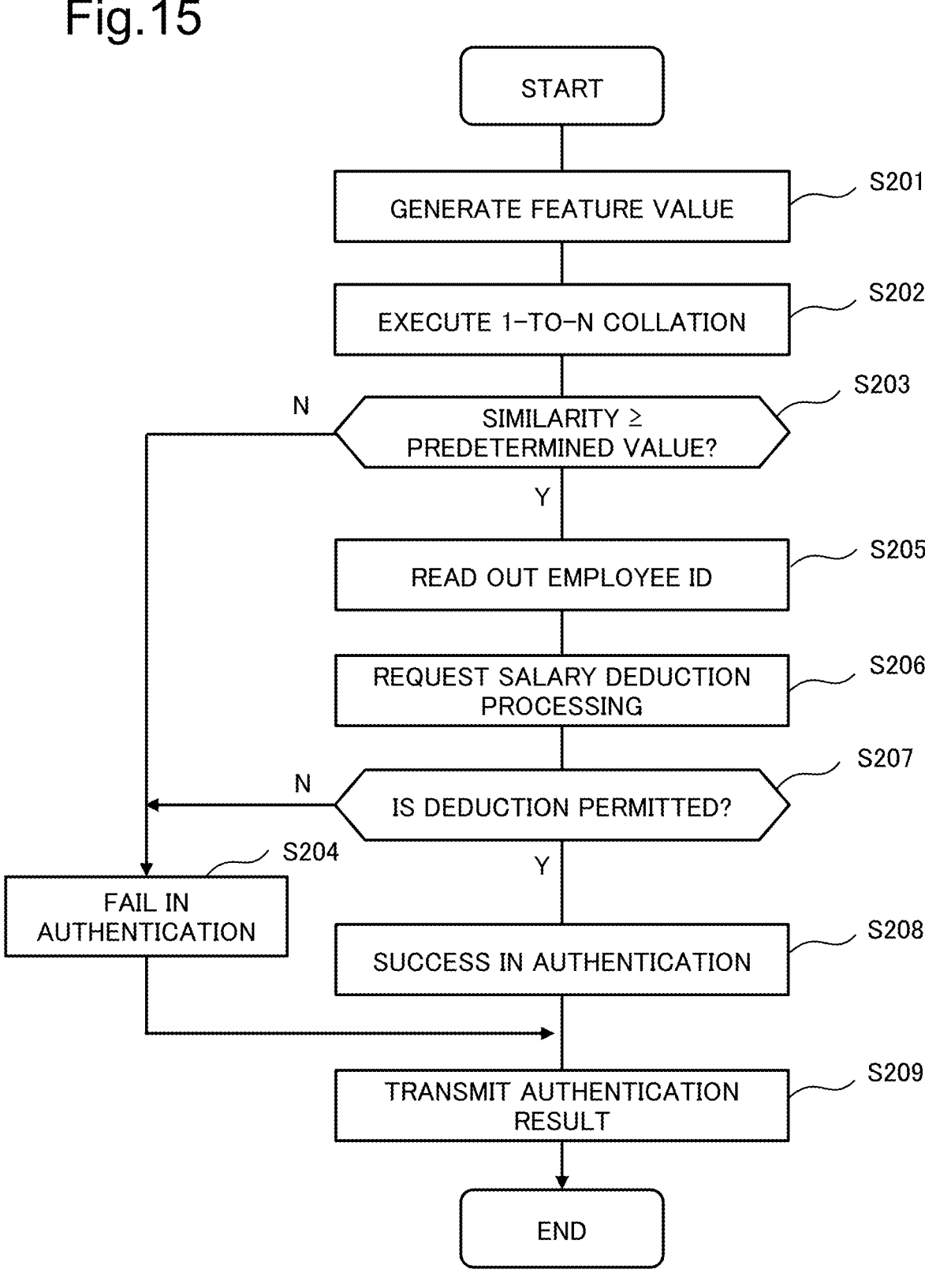
FIG. 15 is a diagram for explaining an operation of the authentication unit according to the first example embodiment.

Next, with reference to FIG. 15, the operation of the authentication unit 203 when processing the authentication request from the head office terminal 20-3 will be described. Since each process of steps S101 to S104 illustrated in FIG. 13 and each process of steps S201 to S204 illustrated in FIG. 15 can be the same, a detailed description thereof will be omitted.

In a case where there is a feature value having similarity of a predetermined value or more to the feature value of the collation target among the plurality of feature values registered in the authentication information database (step S203: Yes branch), the authentication unit 203 performs processing related to payment.

The authentication unit 203 specifies an entry having a feature value having the highest similarity to the feature value on the collation side from among the entries of the authentication information database, and reads the relevant employee ID (step S205).

The authentication unit 203 delivers the read employee ID and the payment information included in the authentication request to the payment processing unit 204, and requests the payment processing unit to perform the salary deduction processing (step S206).

If the processing result from the payment processing unit 204 is "deduction allowed" (step S207: Yes branch), the authentication unit 203 sets the authentication result to authentication success (step S208).

When the processing result from the payment processing unit 204 is "no deduction allowed", the authentication unit 203 sets the authentication result to authentication failure (step S204).

The authentication unit 203 transmits the authentication result to the head office terminal 20-3 (step S209).

Figure 16:
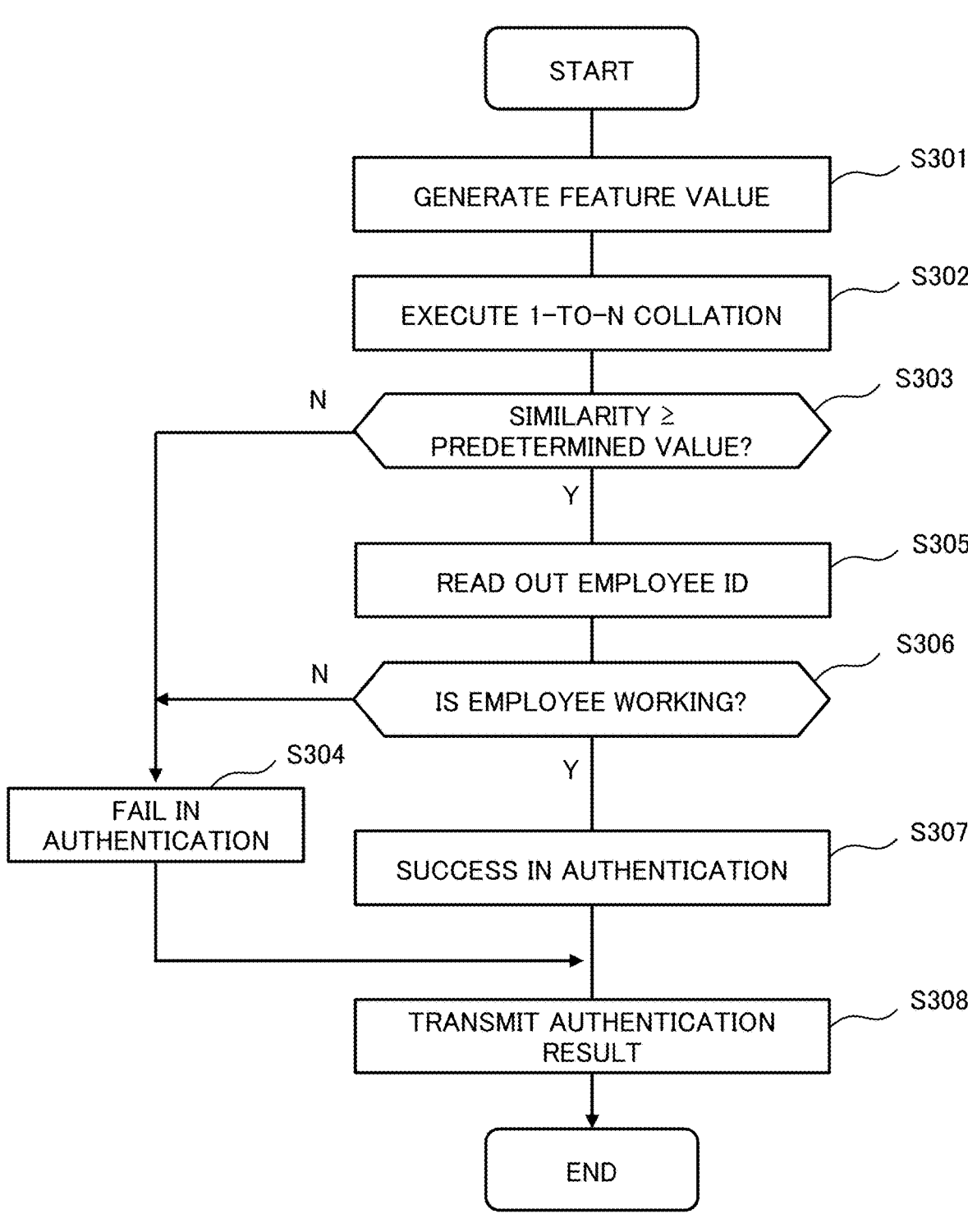
FIG. 16 is a diagram for explaining an operation of the authentication unit according to the first example embodiment.

Next, the operation of the authentication unit 203 when processing the authentication request from the partner terminal 30-3 will be described with reference to FIG. 16. Since each process of steps S101 to S104 illustrated in FIG. 13 and each process of steps S301 to S304 illustrated in FIG. 16 can be the same, a detailed description thereof will be omitted.

In a case where there is a feature value of which the degree of similarity to the feature value of the collation target is equal to or greater than a predetermined value among the plurality of feature values registered in the authentication information database (step S303: Yes branch), the authentication unit 203 executes the processing in and after step S305.

The authentication unit 203 specifies an entry having a feature value having the highest similarity to the feature value on the collation side from among the entries of the authentication information database, and reads the relevant employee ID (step S305).

The authentication unit 203 determines whether the relevant employee is working by using the read employee ID (step S306).

Specifically, the authentication unit 203 searches the attendance management database using the read employee ID as a key, and reads the setting value from the work state field of the specified entry. The authentication unit 203 determines whether the employee is working or not (Withdrawal, Paid) based on the read setting value.

If the authentication target (employee) is working (step S306: Yes branch), the authentication unit 203 sets the authentication result to successful authentication (step S307).

If the authentication target (employee) is not working (step S306: No branch), the authentication unit 203 sets the authentication result to authentication failure (step S304).

For example, consider a case where an authentication request is received from the partner terminal 30-3 of the partner A. In this case, in the example of FIG. 14, since the employees relevant to "ID01" and "ID03" are working, the biometric authentication on these employees is successful. On the other hand, since the employees relevant to "ID02" and "ID04" are not working, the biometric authentication of these employees results in an authentication failure.

The employee relevant to "ID01" is working in the head office building, and the transmission of the authentication request of the employee can be regarded as a case where the employee visits the partner A during the break time.

The authentication unit 203 transmits the authentication result to the partner terminal 30-3 (step S308).

In this manner, the authentication unit 203 receives a third authentication request transmitted from a third authentication terminal (the partner terminal 30-3) installed in the partner restaurant (the second company). The authentication unit 203 executes biometric authentication using the biometric information of a third authentication target included in the third authentication request and a plurality of pieces of biometric information registered in the authentication information database. When the biometric information substantially the same as the biometric information of the third authentication target is registered in the authentication information database and the third authentication target is working, the authentication unit 203 notifies the third authentication terminal of the authentication success.

The payment processing unit 204 is a means that performs payment processing. The payment processing unit 204 transmits the employee ID and the payment information acquired from the authentication unit 203 to a server (system) that manages the salary payment of the employee, and requests the server to perform the salary deduction processing.

The server (not illustrated in FIG. 2 or the like) that has received the request for the salary deduction processing allows the salary deduction if the balance of the salary to be paid to the employee is larger than the product purchase price. The server transmits the result of the salary deduction processing (withdrawal permitted, withdrawal not permitted) to the server device 10.

The payment processing unit 204 delivers the result of the salary deduction processing to the authentication unit 203.

The payment processing unit 204 also processes the case of receiving the "payment processing request" from the partner terminal 30-3 in the same manner as the case of acquiring the payment information from the authentication unit 203. When the salary deduction processing is successful, the payment processing unit 204 transmits an affirmative response indicating the success to the partner terminal 30-3. If the salary deduction processing fails, the payment processing unit 204 transmits a negative response indicating the failure to the partner terminal 30-3.

In this manner, the payment processing unit 204 receives the payment processing request including the payment information regarding the employee transmitted from the partner terminal 30-3. The payment processing unit 204 uses the payment information to perform the salary deduction processing for the employee.

The storage unit 205 is a means that stores information necessary for the operation of the server device 10. For example, the storage unit 205 stores table information that defines a correspondence between a terminal ID and an authentication terminal (head office terminal 20 and partner terminal 30).

Next, details of the authentication terminal (head office terminal 20 and partner terminal 30) will be described. First, the head office terminal 20 will be described.

[Head Office Terminal 20-1]

Figure 17:
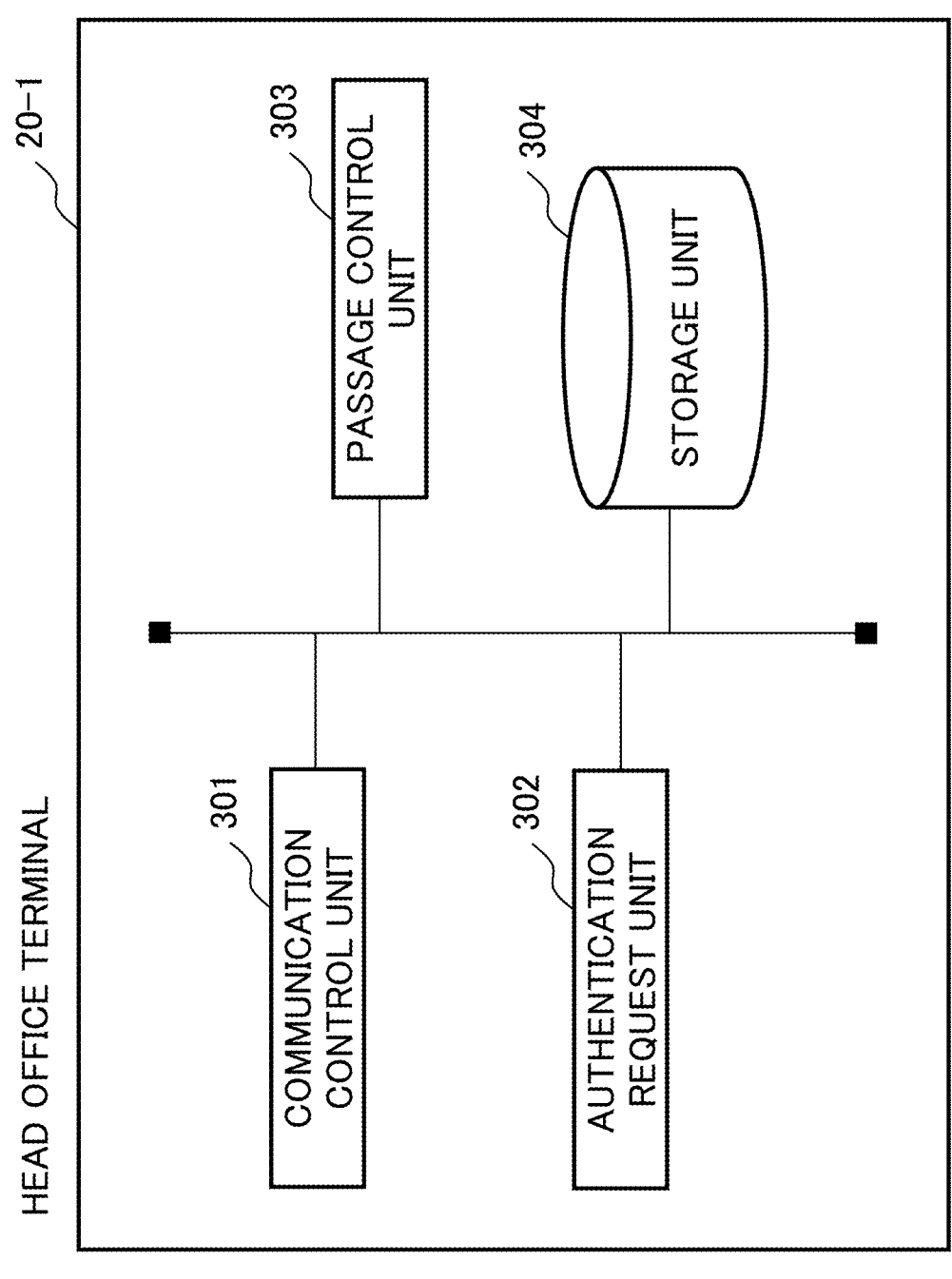
FIG. 17 is a diagram illustrating an example of a processing configuration of a head office terminal according to the first example embodiment.

FIG. 17 is a diagram illustrating an example of a processing configuration (processing module) of the head office terminal 20-1 according to the first example embodiment. Referring to FIG. 17, the head office terminal 20-1 includes a communication control unit 301, an authentication request unit 302, a passage control unit 303, and a storage unit 304.

The communication control unit 301 is a means that controls communication with other devices. For example, the communication control unit 301 receives data (packet) from the server device 10. The communication control unit 301 transmits data to the server device 10. The communication control unit 301 delivers data received from another device to another processing module. The communication control unit 301 transmits data acquired from another processing module to another device. In this manner, the another processing module transmits and receive data to and from other devices via the communication control unit 301.

The authentication request unit 302 is a means that requests the server device 10 to perform biometric authentication of the authentication target. The authentication request unit 302 controls the camera to acquire biometric information (face image) of the user. More specifically, the authentication request unit 302 determines whether a face image of a person is included in the acquired image, and extracts the face image from the acquired image data when the face image is included.

An existing technique can be used for the face image extraction processing by the authentication request unit 302, and thus detailed description thereof will be omitted. For example, the authentication request unit 302 may extract a face image (face area) from the image data by using a learning model learned by a convolutional neural network (CNN). Alternatively, the authentication request unit 302 may extract the face image using a method such as template matching.

The authentication request unit 302 transmits an authentication request including the extracted face image (biometric information) and the terminal ID of the own device to the server device 10.

The authentication request unit 302 acquires an authentication result (authentication success, authentication failure) from the server device 10. The authentication request unit 302 delivers an authentication result (authentication success, authentication failure) to the passage control unit 303.

The passage control unit 303 is a means that controls the passage (passing-through) of a door or a gate by a user.

When the authentication fails, the passage control unit 303 notifies the unsuccessful authentication person (the authentication target determined as the failed authentication) of the failed authentication. For example, the passage control unit 303 notifies the authentication target that the authentication has failed by a display using a display or a voice using a speaker. When the authentication fails, the passage control unit 303 does not permit the unsuccessful authentication person to pass through the door or the gate.

When the authentication succeeds, the passage control unit 303 opens a gate or the like and permits the passage of the authentication target. The passage control unit 303 may notify the successful authentication person that the authentication has succeeded using a display, a voice, or the like.

The storage unit 304 is a means that stores information necessary for the operation of the head office terminal 20-1.

[Head Office Terminal 20-2]

The processing configuration and operation of the head office terminal 20-2 can be similar to those of the head office terminal 20-1, and thus detailed description thereof will be omitted.

[Head Office Terminal 20-3]

Figure 18:
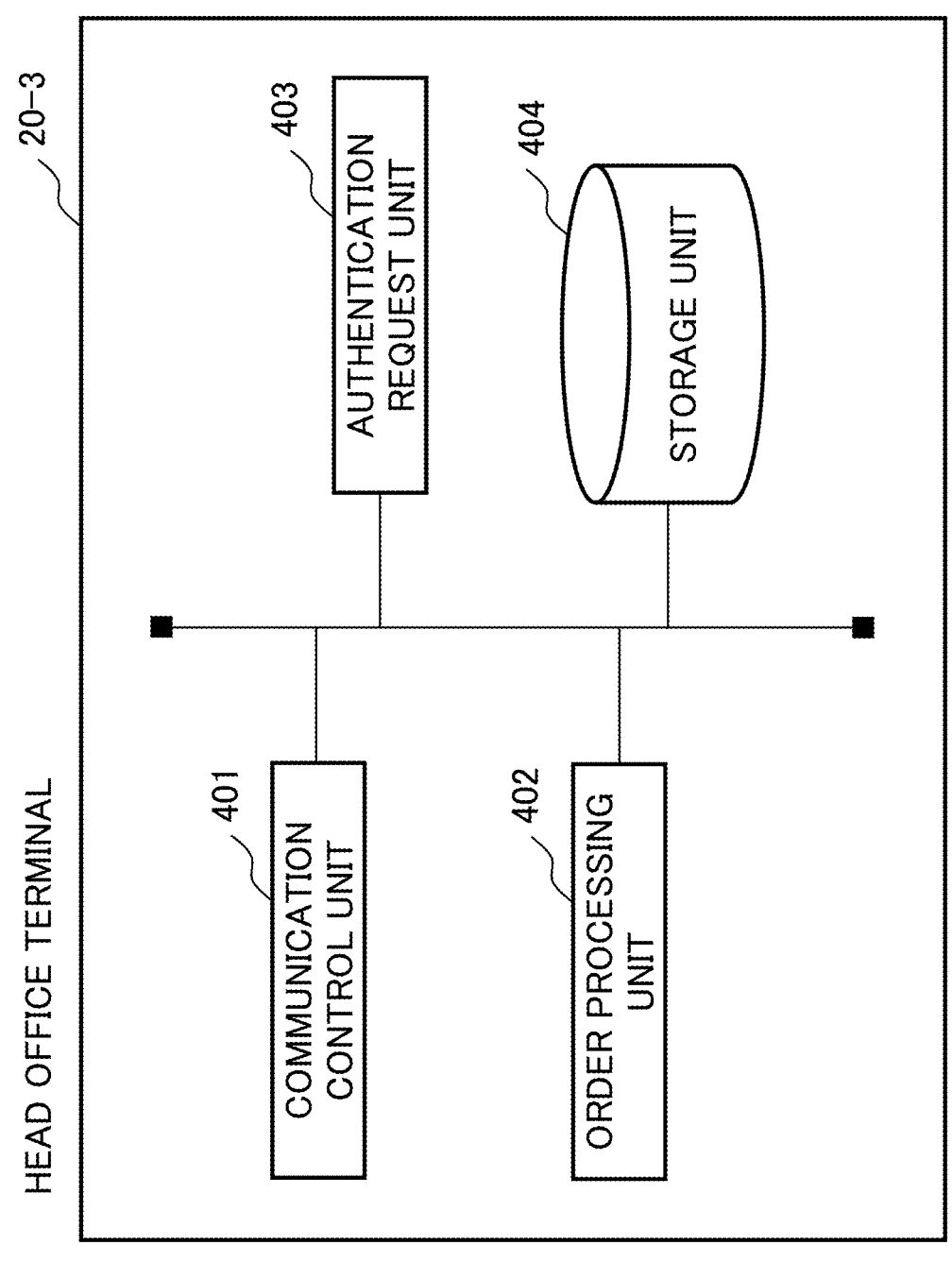
FIG. 18 is a diagram illustrating an example of a processing configuration of the head office terminal according to the first example embodiment.

FIG. 18 is a diagram illustrating an example of a processing configuration (processing module) of the head office terminal 20-3 according to the first example embodiment. Referring to FIG. 18, the head office terminal 20-3 includes a communication control unit 401, an order processing unit 402, an authentication request unit 403, and a storage unit 404.

Similarly to the communication control unit 301 of the head office terminal 20-1, the communication control unit 401 is a means that controls communication with other devices.

The order processing unit 402 is a means that performs processing related to a product order of the user. The order processing unit 402 calculates the total amount of the product purchase price using the barcode or the like, and then displays a GUI enabling selection of a payment method by the user as illustrated in FIG. 6.

When the user (employee) selects "salary deduction", the order processing unit 402 generates payment information and delivers the generated payment information to the authentication request unit 403.

The order processing unit 402 acquires an authentication result (authentication success, authentication failure) from the authentication request unit 403.

When the authentication succeeds, the order processing unit 402 notifies the user that the payment of the product cost has been completed. In the case of the authentication failure, the order processing unit 402 prompts selection of a payment method other than the salary deduction.

The authentication request unit 403 is a means that requests the server device 10 to perform biometric authentication of the authentication target. In response to the acquisition of the payment information from the order processing unit 402, the authentication request unit 403 acquires the biometric information of the authentication target, and transmits an authentication request including the acquired biometric information, terminal ID, and payment information to the server device 10.

The authentication request unit 403 acquires an authentication result (authentication success, authentication failure) from the server device 10. The authentication request unit 403 delivers an authentication result (authentication success, authentication failure) to the order processing unit 402.

The storage unit 404 is a means that stores information necessary for the operation of the head office terminal 20-3.

Next, the partner terminal 30 will be described.
[Partner Terminal 30-1]

The partner terminal 30-1 is an authentication terminal that stores the biometric information of each employee at work in the company and transmits an authentication request including the biometric information of the authentication target who has visited a restaurant having a partnership with the company to the server device 10 that processes the authentication request.

Figure 19:
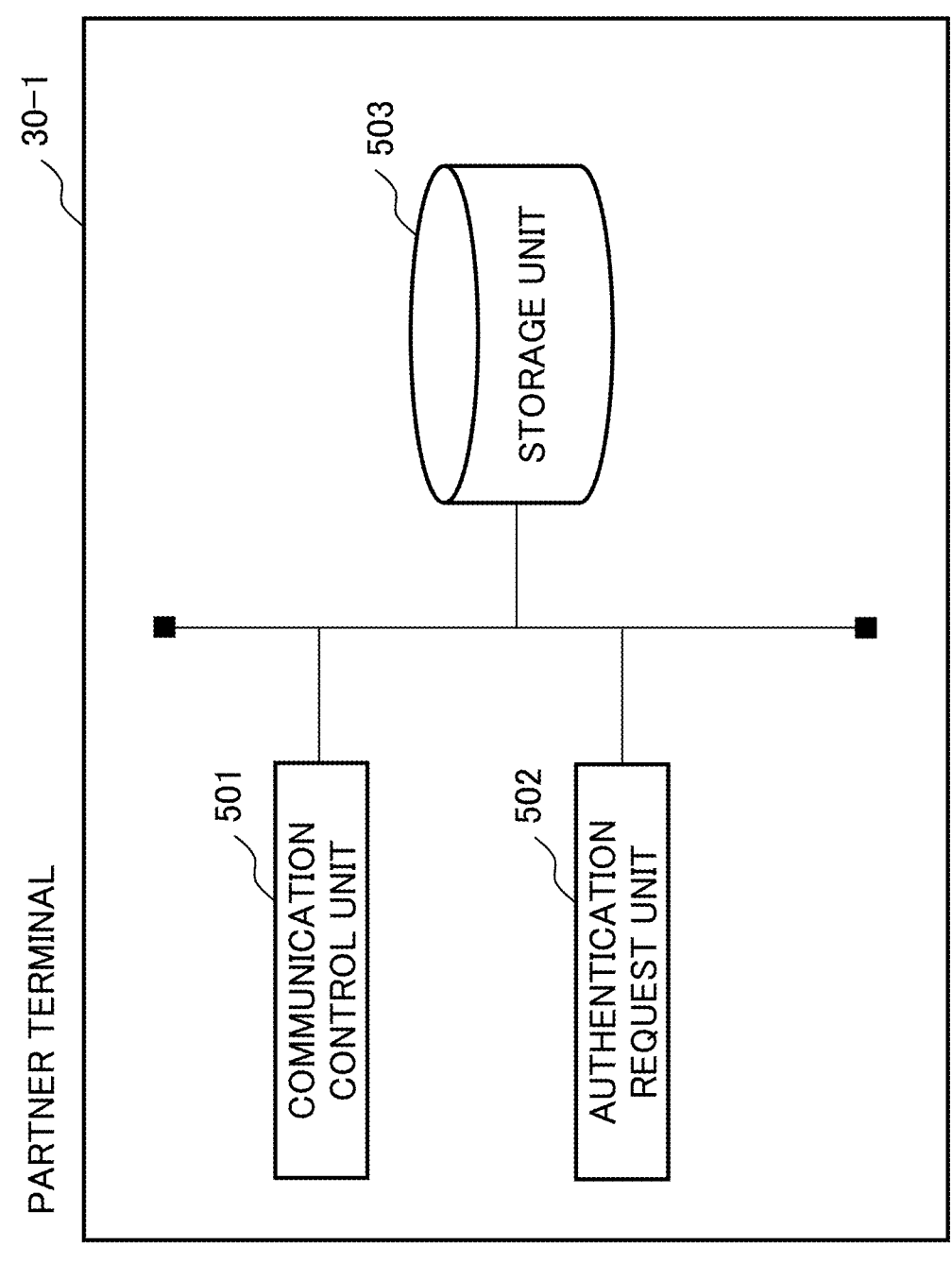
FIG. 19 is a diagram illustrating an example of a processing configuration of a partner terminal according to the first example embodiment.

FIG. 19 is a diagram illustrating an example of a processing configuration (processing module) of the partner terminal 30-1 according to the first example embodiment. Referring to FIG. 19, the partner terminal 30-1 includes a communication control unit 501, an authentication request unit 502, and a storage unit 503.

Similarly to the communication control unit 301 of the head office terminal 20-1, the communication control unit 501 is a means that controls communication with other devices.

Similarly to the authentication request unit 302 of the head office terminal 20-1, the authentication request unit 502 is a means that requests the server device 10 to authenticate the authentication target (an employee who wants to use a restaurant or the like of a partner as a workplace). The authentication request unit 502 may output a message or the like corresponding to the authentication result received from the server device 10.

For example, in a case where the authentication is successful, the authentication request unit 502 may output a message or the like for welcoming the user to the store while displaying the name or the like of the partner company (company using the head office building or the like). When the authentication fails, the authentication request unit 502 takes measures such as reacquiring the biometric information of the authentication target while displaying the fact.

The storage unit 503 is a means that stores information necessary for the operation of the partner terminal 30-1.
[Partner Terminal 30-2]

Since the processing configuration and operation of the partner terminal 30-2 can be similar to those of the partner terminal 30-1, detailed description thereof will be omitted.
[Partner Terminal 30-3]

Figure 20:
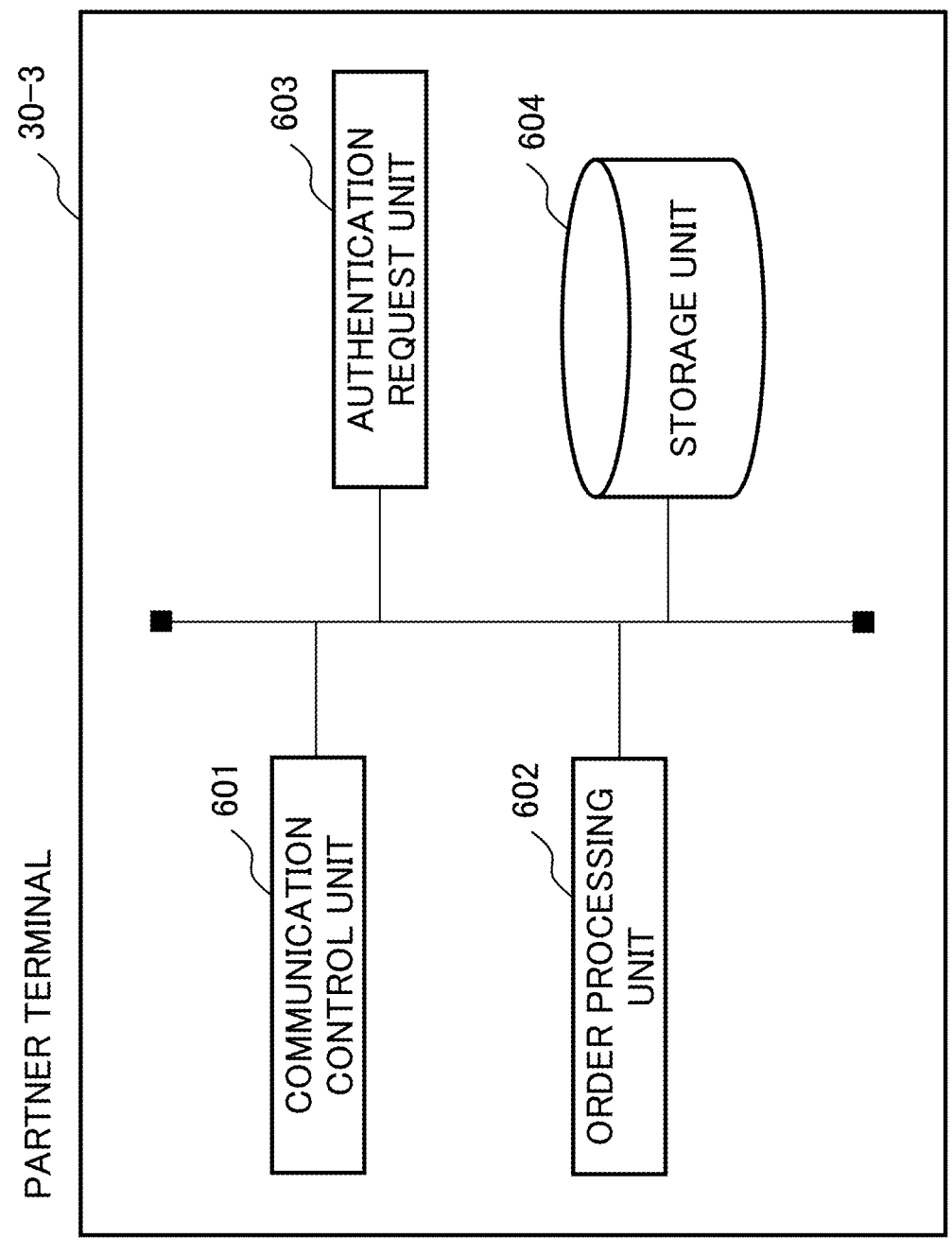
FIG. 20 is a diagram illustrating an example of a processing configuration of the partner terminal according to the first example embodiment.

FIG. 20 is a diagram illustrating an example of a processing configuration (processing module) of the partner terminal 30-3 according to the first example embodiment. Referring to FIG. 20, the partner terminal 30-3 includes a communication control unit 601, an order processing unit 602, an authentication request unit 603, and a storage unit 604.

Similarly to the communication control unit 301 of the head office terminal 20-1, the communication control unit 601 is a means that controls communication with other devices.

The order processing unit 602 is a means that performs processing related to a product order of the user. The order processing unit 602 acquires intention of a user regarding an order for a product or a service provided by a restaurant or the like having a partnership with a company. For example, the order processing unit 602 displays a GUI as illustrated in FIG. 7 as an initial screen. When the "item order" button is pressed, the order processing unit 602 notifies the authentication request unit 603 of the pressing.

The order processing unit 602 acquires an authentication result (authentication success, authentication failure) from the authentication request unit 603.

In a case where the authentication is successful (the authentication target is an employee at work), the order processing unit 602 displays a GUI (product order menu) that prevents selection of a product not appropriate for working hours (for example, alcoholic beverages) as illustrated in FIG. 8A. At that time, the order processing unit 602 may display that alcohol or the like cannot be provided to an employee at work.

In a case where the authentication fails (the authentication target is not an employee at work), the order processing unit 602 displays a product order menu to be provided to a general customer as illustrated in FIG. 8B.

As described above, when receiving the authentication success from the server device 10, the order processing unit 602 presents a first menu to the user. When receiving the authentication failure from the server device 10, the order processing unit 602 presents a second menu to the user. The first menu provided to the user is a menu that does not include a product or a service that is not suitable for company execution by an employee of a company.

The order processing unit 602 displays a GUI for selecting a payment means when the user selects a product and proceeds to payment. In a case where the user is an employee at work, as illustrated in FIG. 9A, the order processing unit 602 displays a GUI including the salary deduction as an option of payment means. In a case where the user is not an employee at work, the order processing unit 602 displays a GUI that does not include the salary deduction as an option of the payment means, as illustrated in FIG. 9B.

When the salary deduction is selected, the order processing unit 602 transmits a payment processing request including the employee ID (employee ID included in the affirmative response), the terminal ID, and the payment information acquired from the server device 10 to the server device 10.

The order processing unit 602 outputs a message or the like corresponding to a response (affirmative response, negative response) to the payment processing request.

The authentication request unit 603 is a means that requests the server device 10 to perform biometric authentication of the authentication target. The authentication request unit 603 acquires the biometric information of the user according to the notification from the order processing unit 602, and transmits an authentication request including the acquired biometric information and the terminal ID to the server device 10.

The authentication request unit 603 acquires an authentication result (authentication success, authentication failure) from the server device 10. The authentication request unit 603 delivers an authentication result (authentication success, authentication failure) to the order processing unit

602. In particular, when the authentication success is received, the authentication request unit 603 delivers the employee ID of the successful authentication person to the order processing unit 602.

As described above, when the user shows an intention to order a product or a service, the authentication request unit 603 transmits an authentication request including the biometric information of the user to the server device 10. The server device 10 determines that the authentication is successful when the authentication target is an employee of the own company and the authentication target is in a work state, and transmits the determination result to the partner terminal 30-3.

The storage unit 604 is a means that stores information necessary for the operation of the partner terminal 30-3.

[Operation of System]

Next, an operation of the authentication system according to the first example embodiment will be described. Here, operations of the partner terminal 30-3 and the server device 10 will be described with reference to FIG. 21.

Figure 21:
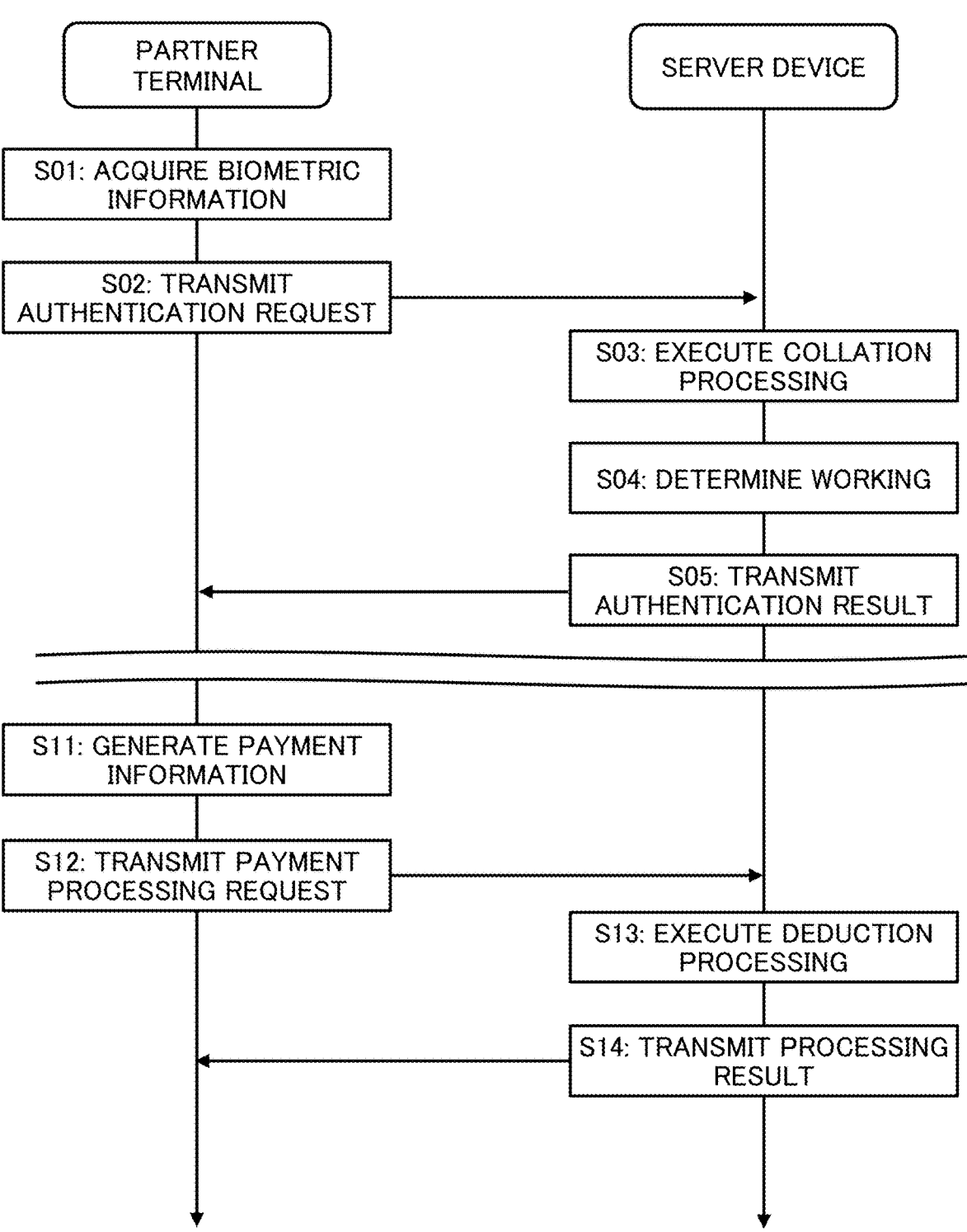
FIG. 21 is a sequence diagram illustrating an example of an operation of the authentication system according to the first example embodiment.

FIG. 21 is a sequence diagram illustrating an example of the operation of the authentication system according to the first example embodiment.

When the user shows an intention to order a product, the partner terminal 30-3 acquires biometric information of the user (step S01).

The partner terminal 30-3 transmits an authentication request including the biometric information to the server device 10 (step S02).

The server device 10 executes collation processing using the biometric information included in the acquired authentication request and the biometric information registered in advance (step S03).

The server device 10 determines whether the employee (authentication target) specified by the collation processing is working (step S04).

If the authentication target is working, the server device 10 sets "authentication success". If the authentication target is not working or if the authentication target is not an employee, the server device 10 sets "authentication failure".

The server device 10 transmits the authentication result (authentication success, authentication failure) to the partner terminal 30-3 (step S05).

When the user purchases a product and selects the salary payment, the partner terminal 30-3 generates payment information (step S11).

The partner terminal 30-3 transmits a payment processing request including the payment information and the employee ID of the product purchaser to the server device 10 (step S12).

The server device 10 specifies the employee based on the employee ID, and executes the deduction processing using the payment information (step S13).

The server device 10 transmits the result of the deduction processing to the partner terminal 30-3 (step S14).

As described above, in the authentication system according to the first example embodiment, a restaurant (such as a cafeteria) located around a company (head office building) can be used as a "workplace" of the company. Specifically, the server device 10 grasps that the employee has entered the partner for the purpose of working by biometric authentication using the authentication request acquired from the authentication terminal installed in the partner. The server device 10 sets the work state of the employee to "working". The employee at work in the head office building can make a payment due to consumption behavior at the partner by the salary deduction. As a result, the employee can use the partner restaurant or the like as if it were his/her workplace or dining room. That is, the convenience of employees is improved. Since a large number of employees working in the head office building use the partner, the economic activities around the head office building are smoothly circulated. That is, the authentication system according to the first example embodiment contributes to forming an economic zone like a "castle town" centered on the head office building.

Figure 22:
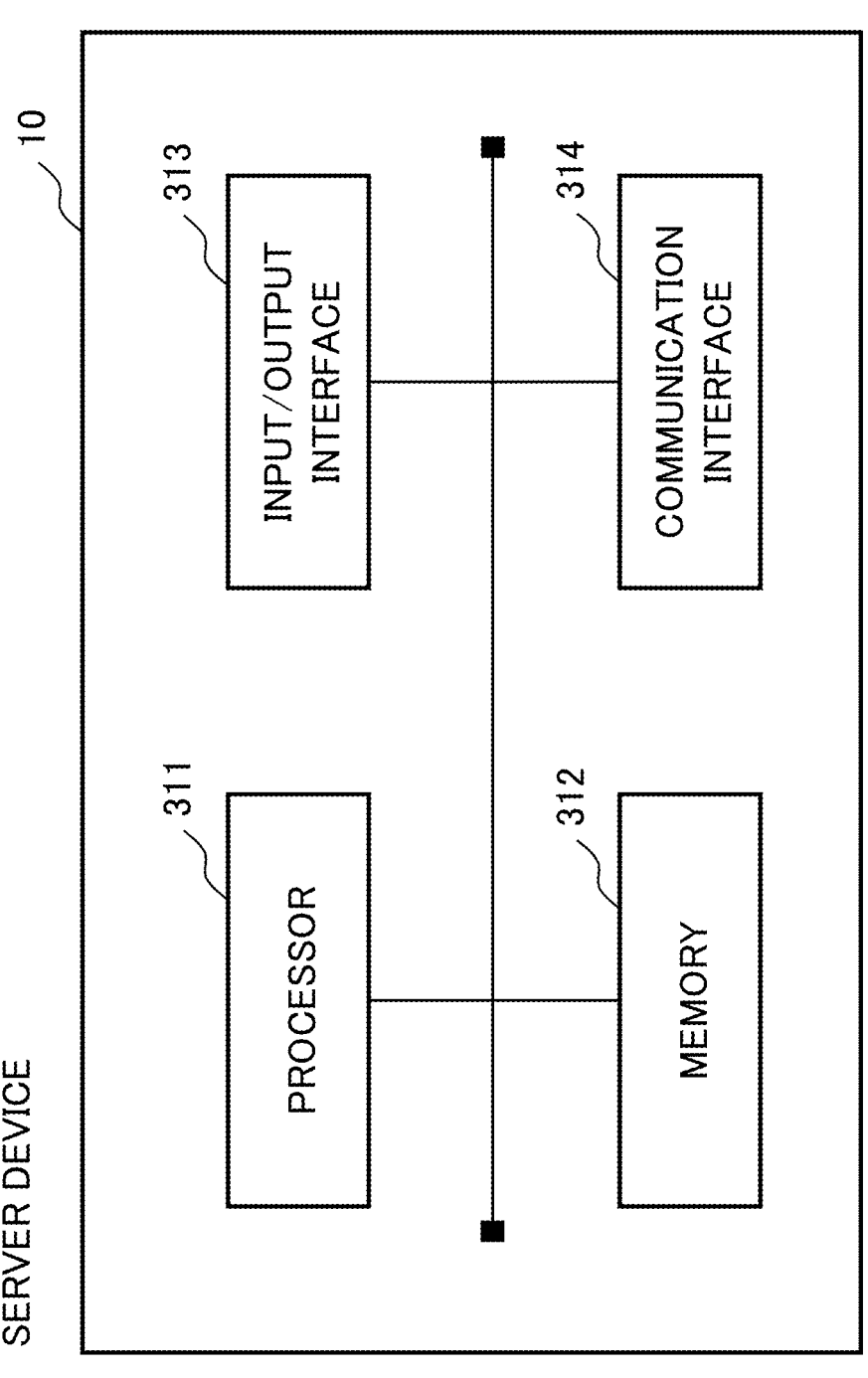
FIG. 22 is a diagram illustrating an example of a hardware configuration of a server device of the disclosure of the present application.

Next, hardware of each device constituting the authentication system will be described. FIG. 22 is a diagram illustrating an example of a hardware configuration of the server device 10.

The server device 10 can be configured by an information processing device (so-called computer), and has the configuration illustrated in FIG. 22. For example, the server device 10 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 22 is not intended to limit the hardware configuration of the server device 10. The server device 10 may include hardware (not illustrated) or may not include the input/output interface 313 as necessary. The number of processors 311 and the like included in the server device 10 is not intended to limit the invention to the example of FIG. 22, and for example, a plurality of processors 311 may be included in the server device 10.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various program including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The functions of the server device 10 are achieved by various processing modules. The processing module is achieved, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. The program can be downloaded via a network or updated using a storage medium storing the program. Further, the processing module may be achieved by a semiconductor chip.

The head office terminal 20 and the partner terminal 30 can also be configured by an information processing device similarly to the server device 10, and since there is no difference in the basic hardware configuration from the server device 10, the description thereof will be omitted. For example, the authentication terminal (head office terminal 20 and partner terminal 30) may include a camera for imaging the user.

The server device 10 which is an information processing device is equipped with a computer, and the function of the server device 10 can be achieved by causing the computer to execute a program. The server device 10 executes the control method of the server device by the program.

[Modification]

The configuration, operation, and the like of the authentication system described in the above example embodiment are merely examples, and are not intended to limit the configuration and the like of the system.

In the above example embodiment, the configuration in which the server device 10 includes the authentication information database and the attendance management database has been described. However, these databases may be constructed in a database server different from the server device 10 or the like. The authentication system may include various means (authentication unit 203, payment processing unit 204, and the like) described in the above example embodiment.

In the above example embodiment, the description has been given assuming that the head office building is a head office building of a private company, but the head office building may be a building such as a city hall. That is, the first company is not limited to a private company, and may be a public institution.

In the above example embodiment, the "restaurant" has been described as an example of the company partner of the company, but the company partner is not limited to the restaurant. For example, a bookstore, a hotel, or the like provided with a table or the like may be a partner. The partner is not limited to a private company, and a public facility such as a library may be the partner.

In the above example embodiment, the three types of the head office terminals 20 have been described as an example. However, the authentication system may include a head office terminal 20 different in use from the three head office terminals 20. For example, the authentication system may include the head office terminal 20 that controls entrance and exit of the conference room.

In the above-described example embodiment, it has been described that the server device 10 acquires the biometric information of the employee and the employee ID at the time of user registration. However, the server device 10 may generate the employee ID at the time of user registration. In the above-described example embodiment, it has been described that the server device 10 generates the employee information database at the time of user registration, but the database may be generated at a timing different from the user registration. That is, the server device 10 may not generate the employee information database.

In the above example embodiment, the "salary deduction" has been described as an example of the payment means selectable by the employee who has succeeded in authentication. However, instead of or in addition to the "salary deduction", "credit payment" may be used as a payment means selectable by the employee. In this case, at the time of user registration, the server device 10 acquires credit information of an employee and registers the acquired credit information in the employee information database. When the employee selects credit payment, the server device 10 acquires credit information registered in the employee information database, and performs payment using the information.

In the above example embodiment, it has been described that a payment means by "salary deduction" can be selected when an employee at work in a partner company purchases a product in the partner company. However, even in a case where an employee who is not working purchases a product at the partner, a payment means by "salary deduction" may be selectable. In this case, when the authentication fails as a result of processing the authentication request from the partner terminal 30-3, the server device 10 notifies the partner terminal 30-3 of the factor of the authentication failure. Specifically, in a case where the biometric information of the authentication target is registered in the authentication information database, but the authentication fails due to the fact that the authentication target is not working, the server device 10 may transmit a negative response including the employee ID of the authentication failure person to the partner terminal 30-3. In a case where the negative response includes the employee ID, the partner terminal 30-3 may display a GUI as illustrated in FIG. 9A. In this manner, the server device 10 may transmit the cause of the failure of the biometric authentication to the authentication terminal.

In a case where the authentication target is an employee of the partner (in a case where the authentication is successful), the partner terminal 30-3 may treat the employee preferentially. For example, the partner terminal 30-3 reduces the price of the product purchased by the employee of the partner, or issues a coupon or the like that can be used at the next visit.

In the above example embodiment, the case where the server device 10 transmits an affirmative response including the employee ID of the authentication target to the partner terminal 30-3 when the authentication is successful when the authentication request from the partner terminal 30-3 is processed has been described. At this time, the server device may transmit an affirmative response including the work place of the authentication target to the partner terminal 30-3 in addition to the employee ID of the authentication target. The partner terminal 30-3 may change the benefit to be given to the employee member according to the place of employment of the successful authentication person. For example, the partner terminal 30-3 may give a larger discount to an employee at work at its own store (the store where the partner terminal 30-3 is placed) or issue a coupon with a better condition.

In the above example embodiment, the case of requesting a server different from the server device 10 to perform payment processing (salary deduction processing) has been described. However, the server device 10 may directly perform the payment processing.

In the above example embodiment, the case where the biometric information related to the "face image" is transmitted from the authentication terminal to the server device 10 has been described. However, the biometric information related to "the feature value generated from the face image" may be transmitted from the authentication terminal to the server device 10. In this case, the server device 10 can omit the feature value generation processing.

In the above example embodiment, the case where the partner terminal 30-1 and the partner terminal 30-2 do not control the gate or the like that restricts entry and exit to and from the partner store by the user has been described.

However, the partner terminal 30-1 and the partner terminal 30-2 may control a gate or the like to restrict entry and exit of the user.

The authentication system of disclosure of the present application may provide information regarding the partner to the employee. For example, when an employee leaves work, the head office terminal 20-2 may display information (name, address, contact information, and the like) of a partner that can be used as a workplace (see FIG. 23). Alternatively, the head office terminal 20-2 may display information (for example, information such as the front entrance of the head office) of a place more easily understandable for the employee member instead of the address of the partner.

Alternatively, the partner terminal 30-3 may display the information of the partner that can be used as the workplace at the time of payment of the product price. Alternatively, the partner terminal 30 may provide information regarding its own store or another partner. More specifically, the partner terminal 30-1 and the partner terminal 30-2 may notify (guide) the customer entering or leaving the store that the own store can be used as a workplace. Alternatively, the partner terminal 30-1 and the partner terminal 30-2 may display a list of stores available as a workplace.

Alternatively, the server device 10 may recommend the authentication target (employee) to work at the partner according to information such as a positional relationship between the head office and the partner store and a time zone (overtime time zone). For example, in a case where the biometric authentication of the employee succeeds in the partner far away from the head office in the overtime time zone, the server device 10 may provide information (name, address, etc.) of the partner that can be used as the workplace.

Figure 24:
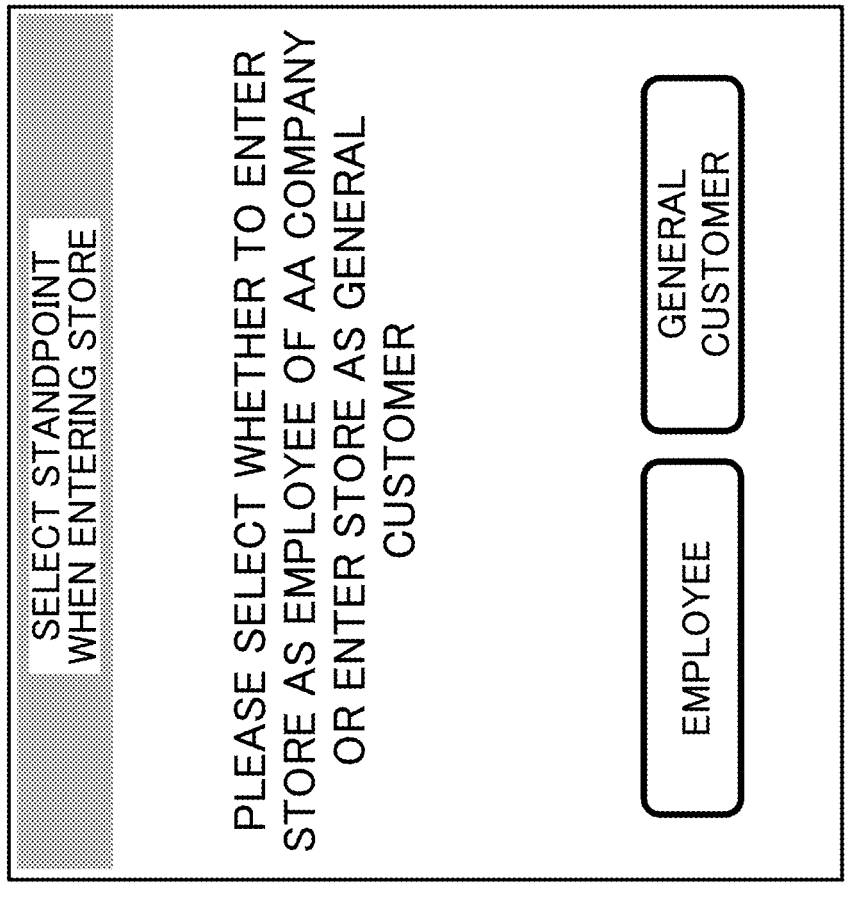
FIG. 24 is a diagram for explaining an operation of a partner terminal according to a modification of the disclosure of the present application.

In a case where the partner terminal 30-1 or the like controls the gate, the partner terminal 30-1 may display a GUI that enables the user to select whether the user intends to enter the partner store in the standpoint of the "employee" or the "ordinary customer". For example, the partner terminal 30-1 (the authentication request unit 502) displays a GUI as illustrated in FIG. 24 as an initial screen. If the user desires to enter the store as an "employee", the partner terminal 30-1 transmits the biometric authentication of the user to the server device 10 as described in the above example embodiment. Upon receiving the successful authentication, the partner terminal 30-1 opens the gate and permits the authentication target to enter the store. When receiving the authentication failure, the partner terminal 30-1 closes the gate and rejects the entry of the authentication target. At that time, the partner terminal 30-1 may notify the authentication target that the person cannot enter the store (the person cannot use the restaurant at work) from the standpoint of the employee. If the user desires to enter the store as a "general customer", the partner terminal 30-1 opens the gate and permits the user to enter the store without transmitting an authentication request to the server device 10. In this manner, the partner terminal 30-1 may be able to select whether the user visits the partner (second company) as an employee of the company (first company) or the user visits the second company as a general customer.

Alternatively, the partner terminal 30-1 may include a human sensor, and display a GUI as illustrated in FIG. 24 in a case where it is detected that the user is located in front of its own device. Similarly, the partner terminal 30-3 may display a GUI as illustrated in FIG. 7 in a case where a person is detected by a detection signal from a human sensor.

The server device 10 may acquire the clock-in information of the employee in advance, and determine whether the user uses the partner as the employee or the general customer based on the clock-in information. Alternatively, the partner terminal 30 may acquire the clock-in information of the employee at the time of the employee entering the store. For example, the server device 10 and the partner terminal 30 acquire clock-in information such as "10:00-17:00; Work, 17:00~; Private". For example, in a case where the server device 10 receives the authentication request from the partner terminal 30-3 within the working time, the server device transmits the authentication success to the partner terminal 30. On the other hand, in a case where the authentication request is received in the private time, the server device 10 transmits the authentication failure to the partner terminal 30-3. The partner terminal 30-3 changes a menu or the like to be presented according to the authentication result.

The server device 10 may cooperate with an attendance management system of the head office. When processing the authentication request from the partner terminal 30-3, the server device 10 sets "authentication success" if the authentication target is an employee and working. On the other hand, the server device 10 sets "authentication failure" if the authentication target is an employee but is not working.

A form of data transmission and reception between the devices (server device 10, head office terminal 20, and partner terminal 30) is not particularly limited, but data transmitted and received between the devices may be encrypted. It is desirable that biometric information is transmitted and received between these devices, and encrypted data is transmitted and received in order to appropriately protect the biometric information.

In the flow diagram (flowchart and sequence diagram) used in the above description, a plurality of steps (processes) are described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiments have been described in detail in order to facilitate understanding of the disclosure of the present application, and it is not intended that all the configurations described above are necessary. In a case where a plurality of example embodiments has been described, each example embodiment may be used alone or in combination. For example, a part of the configuration of the example embodiment can be replaced with the configuration of another example embodiment, or the configuration of another example embodiment can be added to the configuration of the example embodiment. Furthermore, it is possible to add, delete, and replace other configurations for a part of the configuration of the example embodiment.

Although the industrial applicability of the present invention is apparent from the above description, the present invention can be suitably applied to an authentication system including buildings such as companies and local governments and restaurants and the like located in the vicinity of the buildings.

Some or all of the above example embodiments may be described as the following Supplementary Notes, but are not limited to the following.

[Supplementary Note 1]

A server device including:

a registration unit that acquires biometric information of each of a plurality of employees working in a first company and registers the biometric information in a database; and an authentication unit that executes biometric authentication using biometric information of a first authentication target included in a first authentication request transmitted from a first authentication terminal installed in a second company having a partnership with the first company and the plurality of pieces of biometric information registered in the database, and manages that the first authentication target has clocked in to the first company when authentication is successful.

[Supplementary Note 2]

The server device according to Supplementary Note 1, in which the authentication unit executes biometric authentication using biometric information of a second authentication target included in a second authentication request transmitted from a second authentication terminal installed in the second company and the plurality of pieces of biometric information registered in the database, and manages that the second authentication target has clocked out the first company when authentication is successful.

[Supplementary Note 3]

The server device according to Supplementary Note 1 or 2, in which the authentication unit performs biometric authentication using biometric information of a third authentication target included in a third authentication request transmitted from a third authentication terminal installed in the second company and the plurality of pieces of biometric information registered in the database, and notifies authentication success to the third authentication terminal when biometric information of the third authentication target is registered in the database and the third authentication target is working.

[Supplementary Note 4]

The server device according to Supplementary Note 3, further including: a payment processing unit that receives a payment processing request including payment information regarding the third authentication target transmitted from the third authentication terminal.

[Supplementary Note 5]

The server device according to Supplementary Note 4, in which the payment processing unit executes salary deduction processing for the third authentication target using the payment information.

[Supplementary Note 6]

The server device according to any one of Supplementary Notes 1 to 5, in which the biometric information is a face image or a feature value generated from the face image.

[Supplementary Note 7]

An authentication terminal that transmits an authentication request including biometric information of a authentication target who has visited a second company that is in a partnership with a first company to a server device that stores biometric information of each employee at work in the first company and processes the authentication request.

[Supplementary Note 8]

The authentication terminal according to Supplementary Note 7, in which it is possible to select whether a user visits the second company as an employee of the first company or the user visits the second company as a general customer.

[Supplementary Note 9]

An authentication terminal including:

an order processing unit that acquires intention of a user regarding an order of a product or a service provided by a second company having a partnership with a first company; and an authentication request unit that, when the user indicates an intention to order the product or service, transmits an authentication request including biometric information of the user to a server device that stores biometric information of each employee at work in the first company and processes the authentication request, in which the authentication request unit receives an authentication result determined as authentication success when the user is an employee of a first company and the user is in a working state for the first company.

[Supplementary Note 10]

The authentication terminal according to Supplementary Note 9, in which the order processing unit is configured to:

present a first menu to the user when the authentication success is received from the server device, and present a second menu to the user when an authentication failure is received from the server device.

[Supplementary Note 11]

The authentication terminal according to Supplementary Note 10, in which the first menu does not include a product or a service that is not suitable for company execution by an employee of the first company.

[Supplementary Note 12]

A system including:

an authentication terminal that is installed in a second company that is in a partnership with a first company; and a server device that is connected to the authentication terminal, in which the server device includes:

a registration unit that acquires biometric information of each of a plurality of employees working in the first company and registers the biometric information in a database; and an authentication unit that executes biometric authentication using biometric information of a authentication target included in an authentication request transmitted from the authentication terminal and the plurality of pieces of biometric information registered in the database, and manage that the authentication target has clocked in to the first company when authentication is successful.

[Supplementary Note 13]

A control method of a server device, including:

with the server device, acquiring biometric information of each of a plurality of employees working in a first company;

registering the acquired biometric information in a database;

executing biometric authentication using biometric information of a first authentication target included in a first authentication request transmitted from a first authentication terminal installed in a second company having a partnership with the first company and the plurality of pieces of biometric information registered in the database; and managing that the first authentication target has clocked in to the first company when authentication is successful.

[Supplementary Note 14]

A non-transitory computer-readable storage medium storing a program for causing a computer mounted in a server device to execute:

acquiring biometric information of each of a plurality of employees working in a first company;

registering the acquired biometric information in a database;

executing biometric authentication using biometric information of a first authentication target included in a first authentication request transmitted from a first authentication terminal installed in a second company having a partnership with the first company and the plurality of pieces of biometric information registered in the database; and managing that the first authentication target has clocked in to the first company when authentication is successful.

The disclosures of the cited prior art documents are incorporated herein by reference. Although the example embodiments of the present invention have been described above, the present invention is not limited to these example embodiments. It will be understood by those of ordinary skill in the art that these example embodiments are exemplary only and that various variations are possible without departing from the scope and spirit of the present invention. That is, it goes without saying that the present invention includes various modifications and corrections that can be made by those of ordinary skill in the art in accordance with the entire disclosure including the claims and the technical idea.

REFERENCE SIGNS LIST

10, 100 server device
101 registration unit
102, 203 authentication unit
20, 20-1, 20-2 head office terminal
30, 30-1, 30-2 partner terminal
201, 301, 401, 501, 601 communication control unit
202 user registration unit
204 payment processing unit
205, 304, 404, 503, 604 storage unit
302, 403, 502, 603 authentication request unit
303 passage control unit
311 processor
312 memory
313 input/output interface
314 communication interface
402, 602 order processing unit

What is claimed is:

1. An authentication terminal comprising:

at least one memory storing a set of instructions; and at least one processor configured to execute the set of instructions to:

display a graphical user interface that enables a user to select whether to visit a second company as an employee of a first company or to visit the second company as a general customer, the second company having a partnership with the first company;

in a case where the user selects visiting the second company as the employee of the first company, transmit an authentication request including first biometric information that is biometric information of the user to a server device that stores biometric information of each employee at work in the first company and processes the authentication request;

in a case where a successful authentication result determination is received, control a gate to open, thereby permitting the user to enter the second company; and in a case where a failed authentication result determination is received, control the gate to close, thereby refusing entry of the user to the second company; and in a case where the user selects visiting the second company as a general customer, open the gate, thereby permitting the user to enter the second company without transmitting the authentication request.

2. An authentication terminal comprising:

at least one memory storing a set of instructions; and at least one processor configured to execute the set of instructions to:

acquire an intention of a user regarding a product or a service provided by a second company having a partnership with a first company;

when the intention indicates the user intends to order the product or service, transmit an authentication request including first biometric information that is biometric information of the user to a server device that stores database biometric information that is biometric information of each employee at work in the first company and processes the authentication request;

receive a successful authentication result based on determining the user is an employee of the first company and the user is in a working state for the first company;

present a first menu to the user when the successful authentication result is received from the server device, the first menu not including a product or a service that is irrelevant to company execution by the employee of the first company; and present a second menu to the user when a failed authentication result is received from the server device, the second menu including the product or the service that is irrelevant to the company execution by the employee of the first company.

3. The authentication terminal according to claim 1, wherein the second company is a restaurant or a cafeteria having a partnership with the first company.

4. The authentication terminal according to claim 2, wherein the second company is a restaurant or a cafeteria having a partnership with the first company.

\* \* \* \* \*